United States Patent
Cookman et al.

(10) Patent No.: US 12,352,871 B2
(45) Date of Patent: Jul. 8, 2025

(54) MANAGEMENT OF CONCURRENT GNSS RECEPTION AND WIRELESS TRANSMISSION

(71) Applicant: QUALCOMM Incorporated, San Diego, CA (US)

(72) Inventors: Jordan Cookman, San Jose, CA (US); Krishnaranjan Rao, Sunnyvale, CA (US)

(73) Assignee: QUALCOMM Incorporated

( * ) Notice: Subject to any disclaimer, the term of this patent is extended or adjusted under 35 U.S.C. 154(b) by 904 days.

(21) Appl. No.: 17/102,905

(22) Filed: Nov. 24, 2020

(65) Prior Publication Data

US 2021/0157014 A1    May 27, 2021

Related U.S. Application Data

(60) Provisional application No. 62/941,532, filed on Nov. 27, 2019.

(51) Int. Cl.
*G01S 19/30* (2010.01)
*G01S 19/21* (2010.01)
(Continued)

(52) U.S. Cl.
CPC .............. *G01S 19/30* (2013.01); *G01S 19/21* (2013.01); *G01S 19/29* (2013.01); *H04W 4/40* (2018.02)

(58) Field of Classification Search
CPC .......... G01S 19/21; G01S 19/29; G01S 19/33; G01S 19/30; H04W 4/40
See application file for complete search history.

(56) References Cited

U.S. PATENT DOCUMENTS

| 2009/0224975 A1 | 9/2009 | Xhafa et al. |
| 2009/0322596 A1 | 12/2009 | Rowitch et al. |

(Continued)

FOREIGN PATENT DOCUMENTS

| CN | 101339236 A | 1/2009 |
| CN | 102763003 A | 10/2012 |

(Continued)

OTHER PUBLICATIONS

International Search Report and Written Opinion—PCT/US2020/062282—ISA/EPO—Mar. 12, 2021.

(Continued)

*Primary Examiner* — Margaret G Webb
(74) *Attorney, Agent, or Firm* — QUALCOMM Incorporated

(57) ABSTRACT

Disclosed herein are techniques for managing concurrent reception of satellite position signals and transmission of wireless network signals. In some embodiments, a measurement engine is configured to generate measurements based on Global Navigation Satellite System (GNSS) signals received by a GNSS wireless receiver, including a first measurement based on a first GNSS signal. A determination is made as to whether a wireless transmitter is active in a first frequency band when the GNSS wireless receiver receives the first GNSS signal, where the first frequency band is a frequency band of the first GNSS signal. In response to a determination that the wireless transmitter is active in the first frequency band when the GNSS wireless receiver receives the first GNSS signal, a position calculation operation and/or a clock bias calculation operation can be performed using measurements other than the first measurement.

48 Claims, 8 Drawing Sheets

(51) Int. Cl.
    *G01S 19/29*          (2010.01)
    *H04W 4/40*         (2018.01)

(56) References Cited

U.S. PATENT DOCUMENTS

| | | |
|---|---|---|
| 2011/0181468 A1 | 7/2011 | Sun et al. |
| 2011/0261805 A1 | 10/2011 | Landry, Jr. et al. |
| 2015/0198718 A1 | 7/2015 | Khalili et al. |
| 2015/0301191 A1 | 10/2015 | Wallace et al. |
| 2016/0223643 A1* | 8/2016 | Li ................... G01S 7/0236 |
| 2016/0234748 A1* | 8/2016 | Chrisikos ............ H04L 43/065 |
| 2017/0010361 A1* | 1/2017 | Tanaka ................ G01S 19/33 |
| 2017/0324484 A1* | 11/2017 | Saada ................. H02J 50/12 |

FOREIGN PATENT DOCUMENTS

| | | |
|---|---|---|
| CN | 110389362 A | 10/2019 |
| CN | 110418979 A | 11/2019 |

OTHER PUBLICATIONS

Jicheng D., et al., "Research on Narrow-band Interference Suppression in BDS Signal for Reducing Useful Signal Loss", GNSS World of China, vol. 44, No. 5, Oct. 15, 2019, pp. 10-17.

\* cited by examiner

MANAGEMENT OF CONCURRENT GNSS RECEPTION AND WIRELESS TRANSMISSION

CROSS-REFERENCE TO RELATED APPLICATIONS

This application claims the benefit of U.S. Provisional Application No. 62/941,532, filed Nov. 27, 2019, entitled "MANAGEMENT OF CONCURRENT GNSS RECEPTION AND WIRELESS TRANSMISSION" which is incorporated herein by reference in its entirety.

BACKGROUND

1. Field of Invention

The present invention relates generally to the field of wireless communications, and more specifically to mitigating the effects of signal interference between concurrently received wireless signals.

2. Description of Related Art

Global Navigation Satellite System (GNSS) receivers and Wireless Wide Area Network (WWAN) transceivers are often embedded in a mobile device, such as a wearable device, a mobile phone, a laptop computer, an Internet of Things (IoT) device, etc. A GNSS receiver can receive GNSS signals and provide the GNSS signals as input to a position calculation operation or a clock bias calculation operation, whereas a WWAN transceiver can transmit WWAN signals for various communication operations. The WWAN signals, or their harmonics, can be in the same frequency band as the GNSS signals. If a mobile device receives GNSS signals and transmits WWAN signals simultaneously to support concurrent communication and positioning operations, the WWAN signals or their harmonics can interfere with the GNSS signals, which can adversely affect the reception of the GNSS signals as well as the position calculation operation or clock bias calculation operation of the mobile device.

SUMMARY

The present disclosure relates to techniques for managing concurrent reception of satellite position signals (e.g., GNSS signals) and transmission of wireless network signals (e.g., WWAN or Wireless Local Area Network (WLAN) signals). More specifically, the present disclosure relates to techniques for preventing satellite position signals and/or information derived from satellite position signals from being used for position calculation, clock bias calculation, and/or other types of operations when the satellite position signals are received concurrently with transmission of wireless network signals that potentially interfere with the satellite position signals. The present disclosure also relates to techniques for permitting interfered satellite position signals and/or information derived from interfered satellite position signals to be used for some types of operations when the interference does not prevent such operations from being performed successfully. For example, in some embodiments, an interfered GNSS signal may be used for detecting and tracking of another GNSS signal that is not (or less) subject to interference.

Satellite Positioning Systems (SPSs) and wireless transmitters, such as WWAN and WLAN transmitters, are often embedded in a mobile device, such as a wearable device, a mobile phone, a laptop computer, an Internet of Thing (IoT) device, etc. An SPS in a mobile device may include a GNSS receiver to receive GNSS signals and perform a position calculation operation or clock bias calculation operation based on the GNSS signals, whereas WWAN and WLAN transmitters of the mobile device can transmit wireless signals for various communication operations. The SPS may support different satellite position signals including, for example, Global Positioning System (GPS) signals, Global Navigation Satellite System (GLONASS) signals, Galileo signals, BeiDou signals, and/or signals of another type of satellite positioning system. The WWAN transmitter may support various communications systems including, for example, Long Term Evolution (LTE), wideband code division multiple access (WCDMA), and the like. The WLAN transmitter may support various communications protocols including Wi-Fi, Long-Term Evolution (LTE) Direct, etc.

Wireless network signals or their harmonics can be in the same frequency band as the GNSS signals and interfere with the GNSS signals, which can adversely affect the position calculation operation or clock bias calculation operation of the mobile device. For example, Long Term Evolution (LTE) bands B13 and B14 have second harmonic frequencies that fall in the GNSS L1 band. The second harmonic of band 13 overlaps with the BeiDou B1 carrier frequency and partially overlaps the lower sidelobe of the Galileo E1 signal. The second harmonic of band 14 partially overlaps with the upper sidelobe of the Galileo E1 signal. If a mobile device receives GNSS signals and transmits wireless network signals simultaneously to support concurrent communication and position/clock bias calculation operations, the wireless network signals or their harmonics can interfere with the GNSS signals. The interference can cause issues in GNSS reception, including reduced sensitivity and increased probability of false detection, where the interfering signal is mistakenly detected as a GNSS satellite signal. False detection can be especially harmful and can cause very large position errors.

There are many scenarios where concurrent communication and position/clock bias calculation operations are desirable. As an example, a user may use the mobile device to make a phone call and to navigate a locale at the same time while driving. As another example, some applications may use the positioning function and the communication function concurrently, such as real-time position tracking and reporting applications.

In one example, an apparatus may include a wireless transmitter, a measurement engine, one or more processors, and a GNSS wireless receiver. The GNSS wireless receiver is configured to receive a plurality of GNSS signals and to generate a first sequence of correlation outputs from a first GNSS signal. The measurement engine is configured to perform a measurement operation based on the first sequence of correlation outputs, which includes an acquisition operation and a tracking operation, to generate tracking information, and to configure the GNSS wireless receiver based on the tracking information. The measurement engine can also generate a first measurement, which can include a code offset and a navigation message, from the first sequence of correlation outputs. The measurement engine can generate similar measurements from correlation outputs generated by the GNSS wireless receiver based on other received GNSS signals, thereby producing a plurality of measurements. The one or more processors are configured to, responsive to determining that the wireless transmitter is active in a first frequency band when the GNSS receiver receives the first GNSS signal, perform: (i) a position calculation operation using a set of measurements that are from the plurality of measurements and apart from the first measurement or (ii) a clock bias calculation operation using one or more measurements that are from the plurality of measurements and apart from the first measurement. The position calculation operation and the clock bias calculation operation can be performed using a position engine implemented by the one or more processors.

The first GNSS signal may include a first carrier signal modulated to carry a first code for the position calculation operation. The first code may include a ranging code for determining a distance between a satellite and the wireless receiver, and the determined distance can be used for the position calculation operation. The ranging code can be in the form of a pseudo-random noise (PN) code. The first code may also include a first navigation message that includes information to support the position calculation operation, such as satellite position and speed of movement, time and clock correction parameters, etc. The GNSS receiver may down-convert the first GNSS signal to a first baseband signal by multiplying the first GNSS signal with a first replica carrier signal. The GNSS receiver can also perform correlation operations between the first baseband signals and a first reference code to generate the first sequence of correlation outputs, which represent a degree of correlation between the first code included in the first GNSS signal and the first reference code.

As part of the measurement operation, the measurement engine can determine a frequency shift of the first replica carrier signal (from a nominal frequency) needed to down-convert the first GNSS signal to the first baseband signal. The frequency of the replica carrier signal may be shifted from the nominal frequency due to Doppler shift caused by the relative movement between the satellite and the GNSS receiver. The measurement engine can also search for the first code in the first baseband signal based on controlling the GNSS receiver to generate multiple first correlation outputs between the first baseband signal and multiple replicas of the first reference code, where each replica of the multiple replicas has a different phase. The measurement engine can determine a first phase shift of the code between the transmitted and received first GNSS signal based on identifying the phase of the replica of the first reference code that provides the maximum correlation among the multiple first correlation outputs. The first phase shift can be introduced by the flight time of the first GNSS signal between the satellite and the GNSS receiver. As a result of the measurement operation, the measurement engine can generate the tracking information including the frequency shift and first phase shift. The first phase shift can be used to generate a code shift in the first measurement.

The measurement engine can configure the GNSS wireless receiver based on the tracking information to detect and process a second GNSS signal of a second frequency band. For example, the measurement engine can derive a frequency shift based on the frequency shift of the first GNSS signal and provide the derived frequency shift to the GNSS wireless receiver. The GNSS wireless receiver can add the derived frequency shift to the frequency of a second replica carrier signal to compensate for the Doppler frequency shift, and use the frequency shifted second replica carrier signal to down-convert the second GNSS signal to second baseband signals. The measurement engine can also derive a second phase shift from the first phase shift and provide the second phase shift to the GNSS wireless receiver, which can add the second phase shift to a second reference code in the correlation operations to search for a second code in the second GNSS signal, and to obtain second correlation outputs and a second phase shift. The measurement engine can forward the second correlation outputs and the second phase shift to the position engine to perform the position calculation operation, based on determining that the WWAN transmitter is not active in the second frequency band. The position engine can use the second phase shift to determine a pseudorange between the satellite and the GNSS receiver. The position engine can also decode the second correlation outputs to extract a second navigation message. The position engine can then use the information contained in the second navigation message, as well as the pseudorange, to determine a position of the GNSS receiver.

The one or more processors can perform the position calculation operation and/or the clock bias calculation operation without using the first measurement, based on determining that the wireless transmitter is active in the first frequency band, since the wireless transmitter being active in the first frequency band indicates that the first GNSS signal is likely to be interfered by the wireless network signal transmission. The interference can add false peaks to the first correlation outputs, which can lead to incorrect calculation of flight time of the first GNSS signal between the satellite and the GNSS receiver. To avoid introducing errors to the position calculation operation, the one or more processors can perform the position calculation operation without using information derived from the first GNSS signal. For example, the one or more processors can cause the measurement engine to not provide the first phase shift obtained from the tracking and acquisition operation of the first GNSS signal to the position engine for the position calculation operation, or attach an indication to the first phase shift indicating that the first phase shift has low reliability, so that the position engine does not perform the position calculation operation based on the first phase shift. As another example, the one or more processors can cause the measurement engine to transmit a set of default/constant values, or a previously-transmitted measurement, to the position engine, and the position engine can be configured to exclude the default/constant values or the previously-transmitted measurement from the position calculation operation. Exclusion from the clock bias calculation operation can be performed in a similar manner.

In one example, the first GNSS signal can be a Galileo E1 signal. The measurement engine can use the Galileo E1 signal to perform the acquisition and tracking operation to generate frequency offset and phase shift information. The GNSS receiver can be configured with the frequency offset and phase shift information to detect a second GNSS signal, such as a Galileo E5a signal. Information extracted from the processing of the Galileo E5a signal, such as phase offset, etc., can then be provided to the position engine to perform the position calculation operation. If the wireless transmitter is active in the B13 band and/or in the B14 band when the GNSS receiver receives the Galileo E1 signal, such that the second harmonics of the wireless network signals are within the frequency band of the Galileo E1 signal, the phase offset and/or the correlation outputs from the processing of the Galileo E1 signal can be excluded from the position calculation operation at the position engine.

In another example, the first GNSS signal can be a BeiDou B1 signal. The measurement engine can use the BeiDou B1 signal to perform the acquisition and tracking operation to generate frequency offset and phase shift information. The GNSS receiver can be configured with the frequency offset and phase shift information to detect a different BeiDou signal, such as a BeiDou B2a signal. Information extracted from the processing of the BeiDou B2a signal, such as phase offset, etc., can then be provided to the position engine to perform the position calculation operation. If the wireless transmitter is active in the B13 band and/or in the B14 band when the GNSS receiver receives the BeiDou B1 signal, such that the second harmonics of the wireless network signals are within the frequency band of the BeiDou B2a signal, the phase offset and/or the correlation outputs from the processing of the BeiDou B1 signal can be excluded from the position calculation operation at the position engine.

With the disclosed techniques, the satellite positioning system does not have to completely disable reception of certain GNSS signals (e.g., Galileo E1 signal, BeiDou B1 signal, etc.) due to potential interference by the transmission of wireless network signals. Instead, the satellite positioning system can use those signals to perform acquisition and tracking operations. Such arrangements also enable reception and processing of other GNSS signals that are not subject to the interference, such as Galileo E5a signal, BeiDou B2a signal, etc., which may depend on acquisition and tracking of, respectively, Galileo E1 signal and BeiDou B1 signal. Such arrangements can increase the number of satellites available for use in the position calculation operation, especially in environments where the receptions of GNSS signals are poor, to reduce the likelihood of position outages. Limiting the use of potentially interfered GNSS signals in this manner can improve the position calculation operation and user experience.

BRIEF DESCRIPTION OF THE DRAWINGS

Aspects of the disclosure are illustrated by way of example. In the accompanying figures, like reference numbers indicate similar elements.

DETAILED DESCRIPTION

Figure 1:
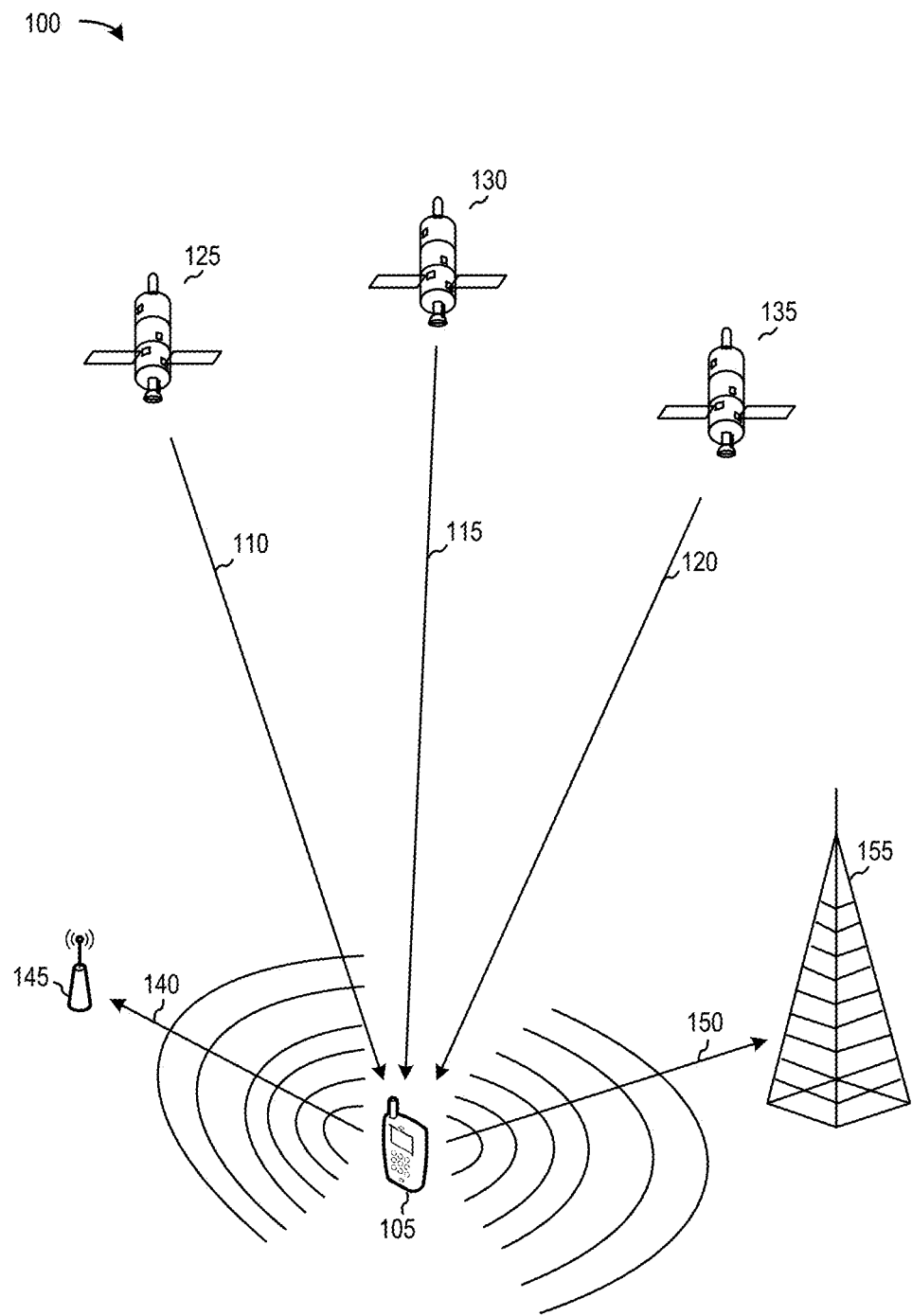
FIG. 1 illustrates a simplified diagram of a system that can incorporate one or more embodiments including satellite position aspects.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

The present disclosure relates to techniques for managing concurrent reception of satellite position signals (e.g., GNSS signals) and transmission of wireless network signals (e.g., WWAN or WLAN signals). More specifically, the present disclosure relates to techniques for preventing satellite position signals and/or information derived from satellite position signals from being used for position calculation, clock bias calculation, and/or other types of operations when the satellite position signals are received concurrently with transmission of wireless network signals that potentially interfere with the satellite position signals. The present disclosure also relates to techniques for permitting interfered satellite position signals and/or information derived from interfered satellite position signals to be used for some types of operations when the interference does not prevent such operations from being performed successfully. For example, in some embodiments, an interfered GNSS signal may be used for detecting and tracking of another GNSS signal that is not (or less) subject to interference.

There are techniques to mitigate the effect of wireless network signal interference on positioning operations. One technique includes improving the isolation of the GNSS and WWAN/WLAN components on the device and/or reducing the amount of non-linearity in the coupling path between WWAN/WLAN transmitter and GNSS receiver, thereby reducing the interference of wireless network signals on the GNSS signals. But such an approach cannot completely eliminate interference and is not useful when there is complete overlap between the wireless network signal frequency band and the frequency band of the GNSS signal, such as in the case of BeiDou B1 signals.

Other techniques may include not using the interfered GNSS signals. One such technique may include disabling the reception of a GNSS signal of a particular frequency band whenever the mobile device is connected to a wireless network signal band and there is a possibility that the wireless network signals of the connection will interfere with that GNSS signal. For example, when a mobile device establishes a connection with a base station via LTE bands 13 and 14, the reception of GNSS signals that can be interfered with by the second harmonics of LTE bands 13 and 14 signals, such as BeiDou B1 and Galileo E1 signal signals, can be disabled. Although such arrangements can reduce false detection due to interference by wireless network signals, the GNSS receiver has fewer satellites to use in computing a position or for other purposes such as computing clock bias. This can increase the position error and, in environments where the reception of GNSS signals is poor, may even cause position outages with the mobile device being unable to determine its most up-to-date position.

Another technique may include blanking the interfered GNSS signals (e.g., BeiDou B1 and Galileo E1 signal signals) when the mobile device is actively transmitting on or simply connected to an interfering wireless network signal band (e.g., LTE bands B13 and B14). Signal blanking can be enabled through additional functionality of a GNSS receiver. For example, the GNSS receiver can include functionality that, when enabled, configures the GNSS receiver to ignore radio signals received via an antenna element. The signal blanking functionality can include forcing the output of an analog or digital signal processing device or operation to a zero or null value or sequence of zero/null values when the mobile device is transmitting on or connected to an interfering wireless network signal band. Although such arrangements can reduce false detection due to interference by wireless network signals, the reduction of false detection comes at the expense of received GNSS signal power. Moreover, the WWAN/WLAN transmitter can be connected to or transmitting on the interfering wireless network signal band for an indefinite amount of time. In such a case, the receiver may never be able to receive the interfered GNSS signal. Both reduction of received GNSS signal power and lack of GNSS signal reception can introduce or increase position error.

In addition, the disabling of the GNSS receiver and blanking of interfered GNSS signals can also prevent the reception of other GNSS signals that are less susceptible to interference by the wireless network signals, especially when the interfered GNSS signals are used in a tracking operation to enable correct processing of such other GNSS signals. For example, in a case where the receiver is designed to first acquire BeiDou B1 signals before tracking BeiDou B2a signals, disabling the BeiDou receiver and/or blanking the BeiDou B1 signals can prevent the receiver from tracking the BeiDou B2a signals, even though the BeiDou B2a signals are less susceptible to interference by LTE bands 13 and 14 second harmonics signals. As another example, in a case where the receiver is designed to first acquire Galileo E1 signals before tracking Galileo E5a signals, disabling the Galileo receiver and/or blanking the Galileo E1 signals can prevent the receiver from tracking the Galileo E5a signals, even though the Galileo E5a signals are less susceptible to interference by LTE bands 13 and 14 second harmonics signals. In both cases, the mobile device cannot use the GNSS signals to perform position calculation even though the GNSS signals are not (or less) susceptible to interference by the WWAN signals.

FIG. 1 illustrates a simplified diagram of an environment 100 in which reception of GNSS signals by a mobile device 105 may be affected by the transmission of WWAN signals by the mobile device. The GNSS signals can be transmitted based on various satellite position signaling standards, such as a Global Positioning System (GPS), Global Navigation Satellite System (GLONASS), Galileo, BeiDou, and/or other type of satellite positioning system. The mobile device 105 can include a satellite positioning system (SPS) which can be compatible with one or more of these satellite position signaling standards. The SPS can process the GNSS signals based on the signaling standards to extract information and perform a position calculation operation based on the extracted information.

Mobile device 105 may be a device designed to perform numerous functions, including the ability to determine its own position based on the reception of GNSS signals from satellites. Mobile device 105 is able to perform satellite-based positioning by receiving GNSS signals from one or more satellites. As shown in FIG. 1, mobile device 105 receives GNSS signals 110, 115, and 120 from satellites 125, 130, and 135, respectively. Typically, each of the GNSS signals 110, 115, and 120 would include timing information (e.g., a timestamp) relating to when the SPS signal was transmitted from the respective satellite. Each GNSS signal may also include ephemeris information which can be used to determine the position of the satellite at the time the GNSS signal is transmitted. Mobile device 105 is able to determine when it receives each of the GNSS signals 110, 115, and 120. The transmission time and reception time of each GNSS signal may be aligned according to a shared timing reference, such as a common clock known to both the mobile device 105 and the transmitting satellite. The transmitting satellite and the mobile device 105 may each have their own local clocks that are synchronized to the common clock. By taking the difference between the reception time and transmission time, mobile device 105 may compute the flight time of each GNSS signal, which is the time taken for the GNSS signal to travel from the respective satellite to mobile device 105. The flight time can then be used to compute the distance between each satellite and mobile device, taking into account the speed of light. Once the distance between each satellite and the mobile device is found, trilateration may be used to compute the position of mobile device 105, based on the known position of each satellite and the distance between each satellite and the mobile device 105.

In addition to satellite-based positioning, a significant category of functions performed by mobile device 105 relates to wireless communications (e.g., communications between terrestrial devices using various wireless protocols). Wireless communications may serve as an important link in connecting mobile device 105 over private and/or public networks with other devices such as servers and other user equipment. This may include communication over various types of wireless networks, including wireless local area networks (WLAN) and wireless wide area networks (WWAN), among others. Examples of WLANs may be different types of Wi-Fi networks, such as those implemented based on various Institute of Electrical and Electronics Engineers (IEEE) 802.11 standards. The example in FIG. 1 focuses on wireless communications between mobile devices and base stations. However, other examples of wireless communications may include peer-to-peer communications between mobile devices such as Wi-Fi Direct, Long-Term Evolution (LTE) Direct, etc. Examples of WWAN may include LTE, wideband code division multiple access (WCDMA), and the like. Additional examples of wireless communications may include near field communications (NFC), Bluetooth communications, etc.

In the example shown in FIG. 1, mobile device 105 is able to perform wireless communications by sending signals to, and receiving signals from, one or more base stations. For instance, mobile device 105 may send a communication signal 140 to an access point 145, which may be a base station supporting LTE communications. Mobile device 105 may send a communication signal 150 to cell tower 155, which may be a base station supporting LTE communications. For instance, signal 140 and/or signal 150 transmitted by mobile device 105 may include an HTTP request for a web page the user of mobile device 105 wants to retrieve from the Internet. Not shown in FIG. 1 are the wireless signals that mobile device 105 may receive back in response to the request. For example, such signals may be sent to mobile device 105 from access point 145 and/or cell tower 155 and may include an HTTP response containing the HTML file constituting the requested web page. FIG. 1 depicts the wireless signals transmitted from mobile device 105 (as opposed to wireless signals received by mobile device 105) because various embodiments address techniques to control the scheduling of wireless signal transmissions from the mobile device in order to reduce interference caused by such transmitted signals.

For example, if mobile device 105 attempts to receive GNSS signals such as 110, 115, and 120 while concurrently transmitting wireless signals such as 140 and 150, interference may cause issues in GNSS reception, including reduced sensitivity and increased probability of false detection. This can occur if received GNSS signals 110, 115, and 120 and transmitted wireless signals 140 and 150 utilize shared or overlapping frequency bands. The interference may also be caused by spectral emissions from adjacent or close frequency bands. This can also occur even when received GNSS signals 110, 115, and 120 and transmitted wireless signals 140 and 150 do not utilize shared or overlapping frequency bands, but intermodulation products introduce interference.

As mentioned previously, interference can occur when mobile device 105 attempts to concurrently transmit WWAN wireless signals (e.g., one or more LTE signals) and receive GNSS signals. This can result if the WWAN signals and the SPS signals utilize shared or overlapping frequency bands. Interference can also result if the wireless signals and the SPS signals do not utilize shared or overlapping frequency bands, but intermodulation products (IM) introduce interference.

Figure 2A:
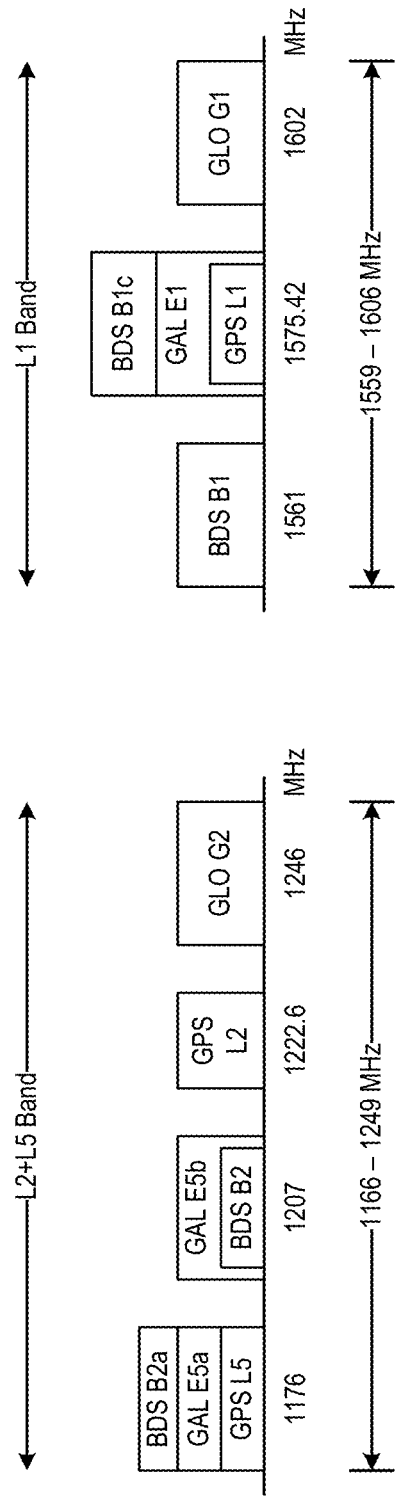
FIG. 2A and FIG. 2B illustrate example spectrum diagrams of GNSS signals and WWAN signals.

FIG. 2A illustrates examples of GNSS signals and their frequency bands. As shown in FIG. 2A, a first set of GNSS signals can occupy a frequency band of 1166-1249 MHz, which corresponds to the IEEE L2 and L5 bands. The first set of GNSS signals may include, for example, BeiDou B2a signal (labeled "BDS B2a"), Galileo E5a and E5b signals (labeled "GAL E5a" and "GAL E5b"), GPS L2 and L5 signals (labeled "GPS L2" and "GPS L5"), and GLONASS G2 signal (labeled "GLO G2"). Each of the first set of GNSS signals includes a carrier of a pre-determined frequency. For example, BDS B2a, GAL E5a, and GPS L5 each has a carrier frequency of 1176 MHz, GAL E5b has a carrier frequency of 1207 MHz, GPS L2 has a carrier frequency of 1222.6 MHz, whereas GLO G2 has a carrier frequency of 1246 MHz+k*437.5 kHz, where k ranges from −7 to +6.

Moreover, a second set of GNSS signals can occupy a frequency band of 1559-1606 MHz, which corresponds to the IEEE L1 band. The second set of GNSS signals may include, for example, BeiDou B1 signal (labeled "BDS B1"), BeiDou B1C signal (labeled "BDS B1C"), Galileo E1 signal (labeled "GAL E1"), GPS L1 signal (labeled "GPS L1"), and GLONASS G1 signal (labeled "GLO G1"). Each of the second set of GNSS signals also includes a carrier of a pre-determined frequency. For example, BDS B1 has a carrier frequency of 1561 MHz, BDS B1C, GAL E1, and GPS L1 each has a carrier frequency of 1575.42 MHz, whereas GLO G1 has a carrier frequency of 1602 MHz+k*562.5 kHz, where k ranges from −7 to +6.

The WWAN signals, such as LTE, as well as the WLAN signals, are typically outside of the L1 and L2+L5 band of the aforementioned GNSS signals. However, intermodulation (IM) products or harmonic distortion of the WLAN and WWAN signals can result in signals which fall into the L1 band and can potentially interfere with the GNSS signals.

As an example, the following interference signals may result from concurrent operation of SPS and communication transceivers:
  (A) LTE B13/B14 (777-798 MHz uplink), second harmonics fall in the GNSS L1 band (e.g., 2×780 MHz=1600 MHz).
  (B) 800 MHz WWAN and 2.4 GHz WLAN, second order IM product (IM2) falls around 1.6 GHz (e.g., 2.4 GHz-800 MHz),
  (C) 1.7/1.9 GHz WWAN and 5 GHz WLAN, third order IM product falls around 1.6 GHz (e.g., 5 GHz-2×1.7 GHz), As can be seen, even though WLAN signals at 2.4 GHz or 5 GHz and WWAN signals at 800 MHz or 1.7/1.9 GHz may not necessarily utilize the same frequency as GNSS signals of the L1 band, it is possible for IM products resulting from the mixing of such WLAN and WWAN signals to land in the same frequencies utilized by GNSS signals.

Figure 2B:
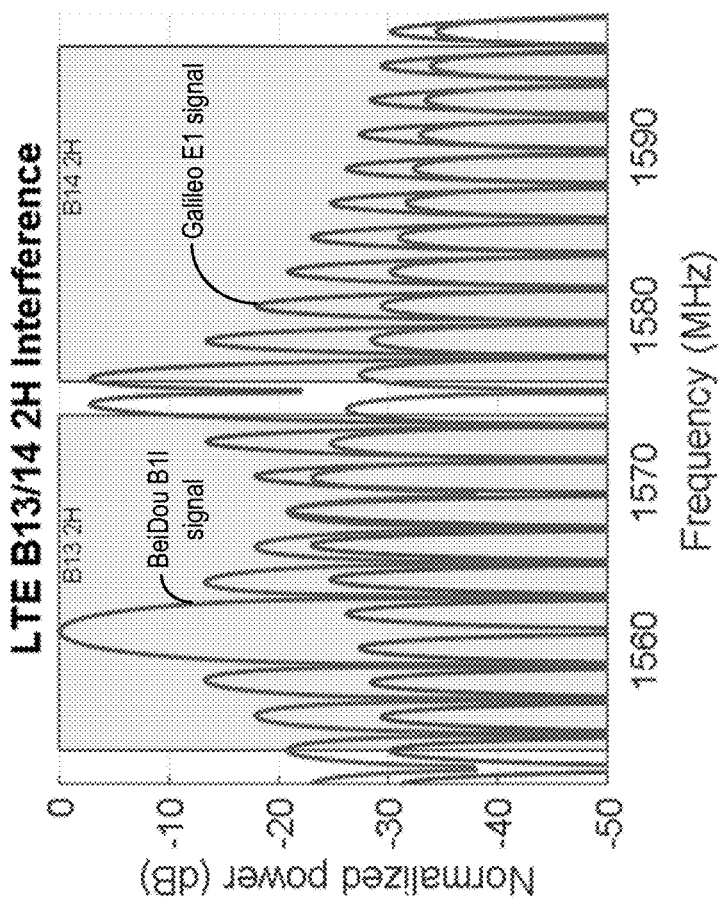

FIG. 2B illustrates an example of the potential interference between second harmonics of the LTE signals and some of the GNSS signals. As shown in FIG. 2B, the second harmonic of LTE band 13 (labeled "B13 2H") overlaps with the BeiDou B1 carrier frequency and partially overlaps the lower sidelobe of the Galileo E1 signal. The second harmonic of LTE band 14 (labeled "B14 2H") partially overlaps with the upper sidelobe of the Galileo E1 signal. Such harmonics may thus interfere with the GNSS signals.

The interference can cause issues in GNSS reception, including reduced sensitivity and increased probability of false detection, where the interfering signal is mistakenly detected as a GNSS satellite signal. False detection can be especially harmful and can cause very large position errors. For example, as part of the position calculation operation, the SPS may be configured to detect a peak of a GNSS signal (e.g., a BeiDou B1 signal, a Galileo E1 signal, etc.), measure the timing of the peak, and use the timing to estimate the flight time of the signal as well as the distance between the mobile device and the satellite that transmits the GNSS signal. The interference of the GNSS signal by the second harmonics of the LTE B13/B14 signal can introduce a false peak in the GNSS signal. If the SPS treats the false peak as the real peak of the GNSS signal and obtains an incorrect measurement of the flight time as a result, the position determined from the flight time can become incorrect as well.

Figure 3A:
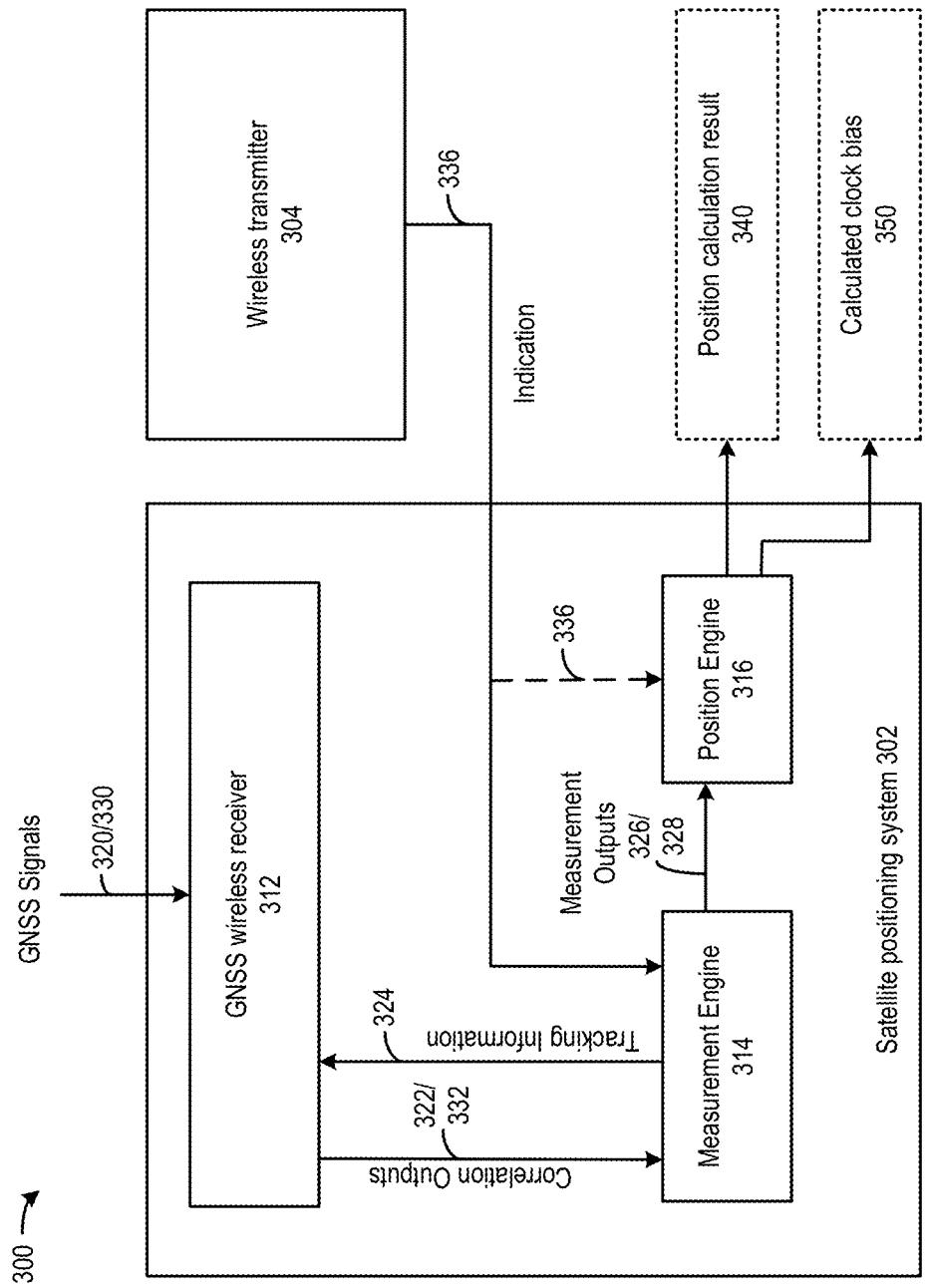
FIG. 3A, FIG. 3B, and FIG. 3C illustrate simplified bock diagrams of a system that can manage concurrent reception of GNSS signals and transmission of wireless network signals.
Figure 3B:
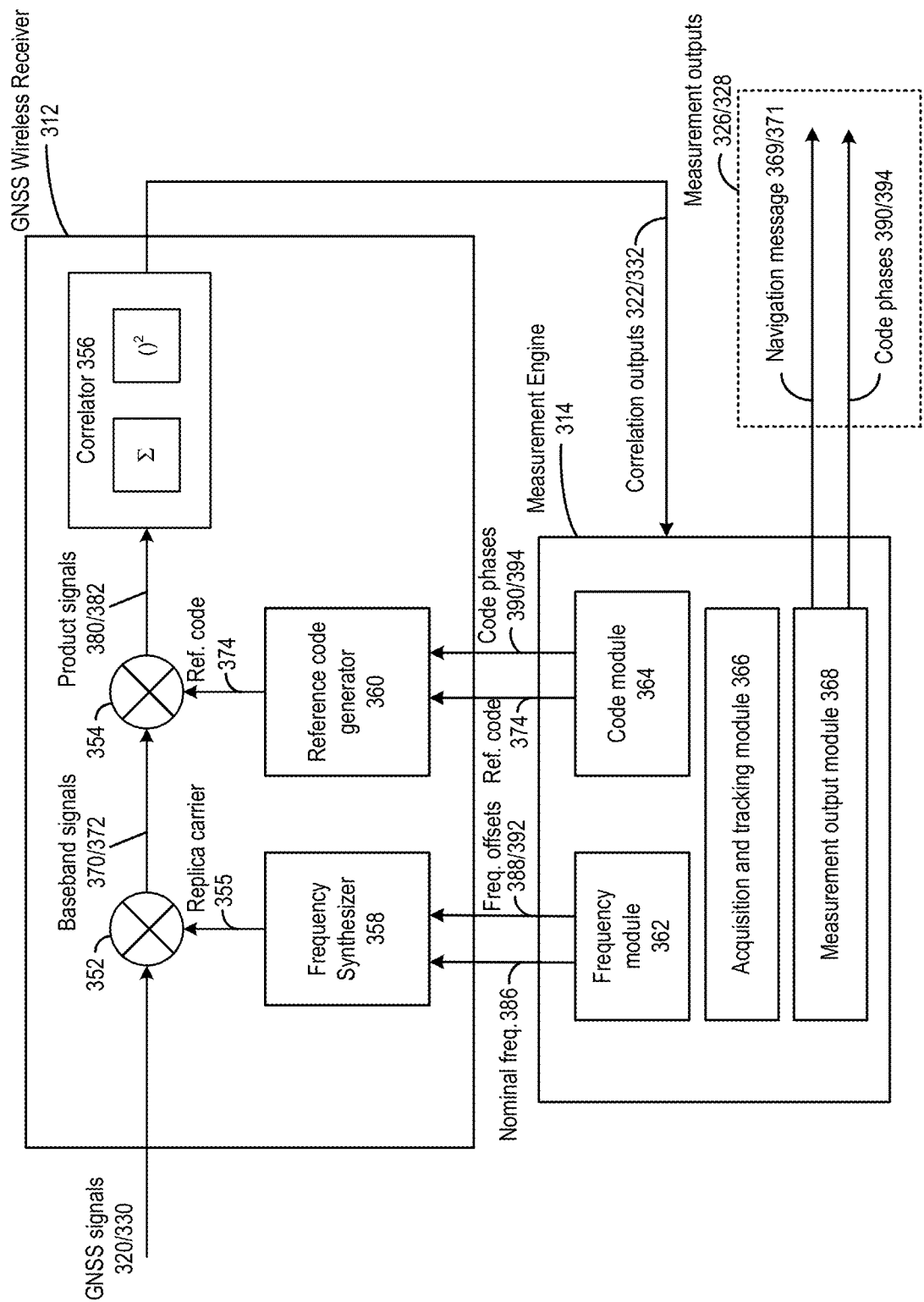
Figure 3C:
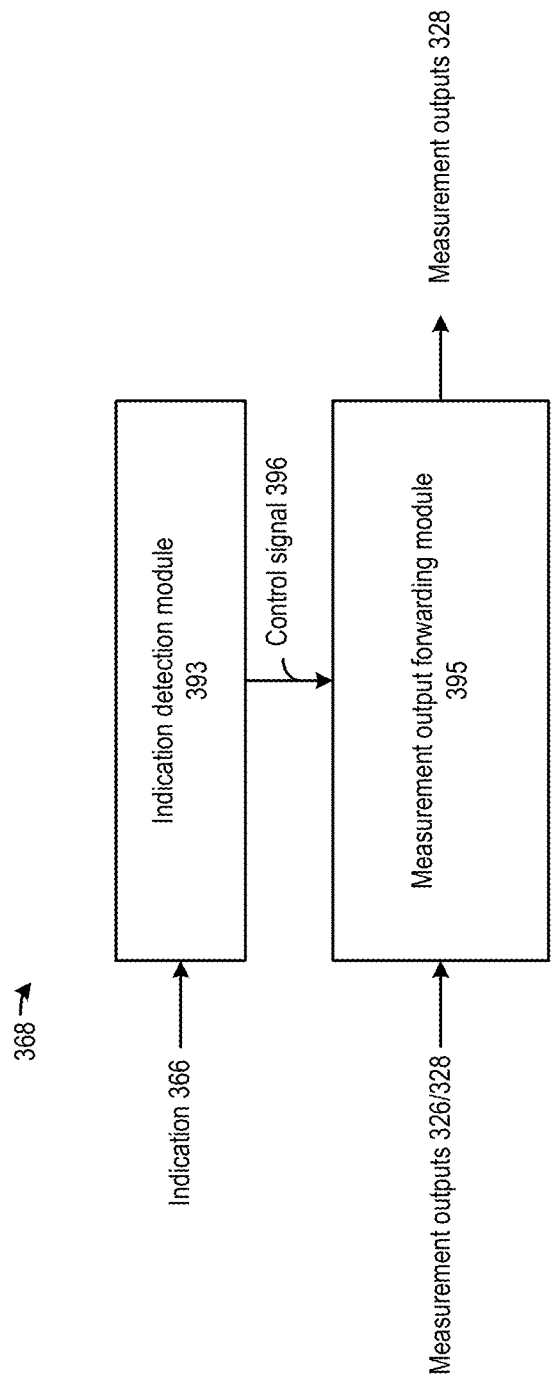

FIG. 3A-FIG. 3C illustrate examples of a communication system 300 that can facilitate concurrent reception of GNSS signals and transmission of wireless network signals. As shown in FIG. 3A, communication system 300 includes an SPS 302 and a wireless transmitter 304. Communication system 300 can be part of a mobile device, such as mobile device 105 in FIG. 1. SPS 302 includes a GNSS wireless receiver 312, a measurement engine 314, and a position engine 316.

GNSS wireless receiver 312 can receive GNSS signals of various satellite position signaling standards, such as Global Positioning System (GPS), Global Navigation Satellite System (GLONASS), Galileo, BeiDou, and/or other type of satellite positioning system. Wireless transmitter 304 can transmit wireless network signals for various communication protocols/standards, such as LTE, Wi-Fi, etc. Based on the outputs of GNSS wireless receiver 312, measurement engine 314 can perform measurements of the GNSS signals and provide the measurements to position engine 316, which can then perform position calculation operations to calculate a position of GNSS wireless receiver 312. In some examples, measurement engine 314 and position engine 316 can be implemented as hardware circuits such as, for example, application specific integrated circuit (ASIC), field programmable gate array (FPGA), etc. In some examples, measurement engine 314 and position engine 316 can be implemented as software modules executable by a hardware processor.

In some examples, GNSS wireless receiver 312 can receive a first GNSS signal 320 of a first frequency band (e.g., BDS B1 signal and/or GAL E1 signal of FIG. 2A) and process the first GNSS signal 320 to generate first correlation outputs 322. Measurement engine 314 can perform an acquisition and tracking operation based on correlation outputs 322 to generate tracking information 324, and to configure GNSS wireless receiver 312 based on tracking information 324 for tracking of other GNSS signals, such as a second GNSS signal 330 (e.g., BDS B2a signal and/or GAL E5a signal of FIG. 2A). Tracking information 324 may include data representing, for example, a frequency shift, a phase offset, etc.

In addition, the measurement engine 314 may generate first measurement outputs 326 from first correlation outputs 322. Measurement engine 314 is further configured to, responsive to determining that wireless transmitter 304 is active in the first frequency band (e.g., the wireless transmitter transmits a wireless network signal in the first frequency band, a harmonic of the wireless network signal is in the first frequency band, etc.), exclude first measurement outputs 326 from a position calculation operation by position engine 316. Exclusion can be accomplished in various ways. For example, measurement engine 314 can prevent first measurement outputs 326 from being forwarded to the position engine. Alternatively, measurement engine 314 can mark first measurement outputs 326 with an indicator to allow position engine 316 to ignore the measurement outputs based on recognition of the indicator. As another example, measurement engine 314 can transmit a set of default/constant values (which can be zero or non-zero), a previous set of measurement outputs obtained by measurement engine 314 for a particular satellite, etc., to position engine 316. Upon receiving a set of default/constant values, position engine 316 may ignore the set of default/constant values and not use those values in the position calculation operation.

Similarly, in a case where the previous set of measurement outputs are used by position engine 316 for the position calculation operation, position engine 316 may be configured to, based on recognizing that it has already received the previous set of measurement outputs once (e.g., in connection with an earlier position calculation operation), ignore the previous set of measurement outputs if it receives those same measurement outputs again. Accordingly, the position engine 316 can exclude those same measurement outputs from the position calculation operation. The determination can be based on, for example, an indication 336 from wireless transmitter 304. Measurement engine 314 is also configured to forward second measurement outputs 328, which the measurement engine 314 generates based on processing of correlation outputs 332 generated by GNSS wireless receiver using the second GNSS signal 330, to position engine 316. The position engine 315 may be configured perform the position calculation operation by using any forwarded GNSS signals (e.g., second GNSS signal 330) to generate a position calculation result 340. In some examples, position engine 316 can, based on receiving the indication 336, ignore (or otherwise not use) first measurement outputs 326 to instead use the second measurement outputs 328 (and possibly measurement outputs derived from other GNSS signals besides the first GNSS signal) to generate position calculation result 340.

In some examples, position engine 316 or a separate engine of the SPS 302 may be configured to perform a clock bias calculation to determine a clock bias of a local clock used as a time reference by the position engine 316. Accordingly, as shown in FIG. 3A, the position engine 316 may be configured to calculate a clock bias 350. As mentioned above, the transmission time and reception time of each GNSS signal may be aligned according to a shared timing reference, such as a common clock, known to the mobile device 105. The local clock that is used as a time reference by the position engine 316 (e.g., a clock driven by a quartz oscillator on the mobile device 105) may be synchronized to the shared timing reference using, for example, timing information received from GNSS signals and/or a server. The synchronization can be performed periodically to correct for clock bias caused by drifting of the local clock. Clock drift can occur when the local clock operates at a rate that is slightly different from that of a reference clock (e.g., the common clock) so that even if the local clock and the reference clock are initially in sync, the local clock will gradually become desynchronized over time.

To correct for clock bias (e.g., for any clock bias 350 above a certain threshold), the position engine 316 may calculate the clock bias as a difference between the local clock and the reference clock and adjust the local clock's time to match that of the reference clock based on the amount of clock bias. There are various techniques for calculating clock bias. In some instances, position engine 316 may calculate the clock bias using a single GNSS signal in combination with information about the known position of the GNSS receiver/mobile device. To calculate the clock bias using this method, the position engine 316 can determine the distance between the satellite that transmits the GNSS signal and the GNSS receiver using, for example, ephemeris information included in the GNSS signal. In this case, since the position of the GNSS receiver is known, the distance between the satellite and the GNSS receiver can be determined with a greater degree of precision (less uncertainty) compared to the pseudorange determination discussed above in connection with position calculation. Based on this distance estimate, the position engine 316 is able to precisely determine an expected flight time from when the satellite transmits the GNSS signal to when the GNSS signal is received at the GNSS receiver. If the flight time as determined based on the time of the local clock does not match the expected flight time, this would indicate that the local clock is not synchronized with the clock used by the satellite to determine the transmission time of the GNSS signal. The position of the GNSS receiver may be known based on a previous position calculation operation performed by the position engine 316. Other sources of information about the position of the GNSS receiver may also be available. For example, the position can be determined using an inertial sensor, based on wired and/or wireless communication with terrestrial entities, etc.

In certain embodiments, a clock that has been bias-corrected using the techniques described herein provides timing information for synchronous wireless communication between a mobile device and another entity. For example, in a vehicle-to-everything (V2X) or cellular vehicle-to-everything (C-V2X) setting, the mobile device 105 may be onboard a vehicle that is in communication with other V2X or C-V2X enabled vehicles (e.g., communications involving V2X messages sent and received by wireless transmitter 304 or some other wireless communications device of the mobile device 105 such as a dedicated V2X receiver). V2X and C-V2X communication relies on the availability of accurate timing information, e.g., timing information derived from GNSS signals, since communications are sent during specific time slots. For example, a first vehicle may be assigned a set of time slots for transmission, while a second vehicle in communication with the first vehicle is assigned a separate set of time slots that are non-overlapping with the slots assigned to the first vehicle. In order to ensure that each vehicle transmits during its assigned time slots and not outside its assigned slots, the first vehicle and the second vehicle should be synchronized to a shared time reference such as GPS time. Accurate time computation is therefore important for synchronous communication such as V2X or C-V2X communication. Based on the discussion of clock bias calculation above, it will be apparent that the clock bias calculation techniques described herein can be applied to prevent GNSS signals that are subject to interference from being used for a clock bias calculation, leading to a more accurate time computation. Additionally, the clock bias calculation techniques described herein can permit a mobile device (e.g., a C-V2X transmitter) to continue to remain active even during times when there are not enough GNSS signals to compute position since, as explained above, clock corrections can still be determined in such situations based on a known position.

Calculating clock bias based on a single GNSS signal is advantageous in situations where multiple GNSS signals are not available. For instance, if the mobile device 105 is onboard a vehicle, the position engine 316 may be able to calculate the vehicle's position during a time when enough GNSS signals are available for position calculation. The calculated position can be stored in a memory of the mobile device 105 and used to later determine the clock bias during a time when there are not enough GNSS signals for position calculation, for example, when the vehicle is turned on after being parked for some time and thus needs to reacquire GNSS signals. This would enable the mobile device 105 to correct its local clock in preparation for a subsequent position calculation operation once enough GNSS signals become available again.

Similar to the exclusion of measurement outputs from a position calculation operation when the GNSS signal from which the measurement outputs are derived is subject to interference, input to a clock bias calculation operation can also be excluded from the clock bias calculation operation when the GNSS signal from which the input to the clock bias calculation is derived is subject to interference. This is because when there is interference, the GNSS receiver may detect a false correlation peak, causing the GNSS receiver to measure the code phase of the GNSS signal incorrectly, resulting in an incorrect flight time estimate. A clock bias calculated using this incorrect flight time estimate would therefore also be incorrect. When an input is excluded from a clock bias operation, a corresponding input can be obtained using an alternative source (e.g., a second GNSS signal that is not subject to interference). If an alternative source is not available (e.g., because only one GNSS signal is available and that GNSS signal is subject to interference), then the clock bias calculation operation can be postponed until a suitable GNSS signal becomes available.

Clock bias calculation can be performed concurrently with position calculation, and both operations may share certain inputs. For instance, in some implementations, the position engine 316 is configured to derive input to a clock bias calculation operation using the contents of a navigation message included as part of measurement outputs (e.g., the first measurement outputs 326 or the second measurement outputs 328). The contents of the navigation message may include satellite position (e.g., ephemeris information) and/or other information by which the distance between the satellite and the GNSS receiver and/or flight time can be determined. The determined distance and/or flight time can be used to correct for any clock bias and, as discussed above, can also be used to estimate the position of the GNSS receiver. Thus, measurement outputs derived using an interfered GNSS signal can be excluded from position calculation, clock bias calculation, or both.

Measurement outputs can be excluded from clock bias calculation in a similar manner to exclusion from position calculation. For example, the same indication 336 can be used to exclude a particular set of measurement outputs from position calculate as well as clock bias calculation. In some instances, exclusion may result in insufficient input for position calculation and/or clock bias calculation. For example, if there are only two other GNSS signals besides the interfered signal, this may be insufficient for obtaining a position fix, but clock bias calculation is still possible assuming the current position of the GNSS receiver is known. If there are no other GNSS signals, then both position calculation and clock bias calculation may no longer be possible.

FIG. 3B illustrates example internal components of GNSS wireless receiver 312 and measurement engine 314. As shown in FIG. 3B, GNSS wireless receiver 312 includes a first multiplier 352, a second multiplier 354, a correlator 356, a frequency synthesizer 358 (e.g., a variable frequency oscillator), and a reference code generator 360. Measurement engine 314 includes a frequency module 362, a code module 364, an acquisition and tracking module 366, and a measurement output module 368.

An input GNSS signal, such as first GNSS signal 320 and second GNSS signal 330, generally includes a carrier signal modulated to carry an input code. The input code may include a ranging code for determining a pseudorange between a satellite and the wireless receiver, which can be used for a position calculation operation. The input code may also include a navigation message that includes information to support the position calculation operation, such as satellite position (e.g., ephemeris information), satellite speed of movement, time and clock correction parameters (which can also support clock bias calculation), etc. First multiplier 352 can multiply the input GNSS signal with a replica carrier signal 355 to down-convert the input GNSS signal to a baseband signal, such as baseband signal 370 (from first GNSS signal 320), baseband signal 372 (from second GNSS signal 330), etc. Second multiplier 354 can multiply the baseband signal with a reference code 374 to generate a product signal (e.g., product signal 380 from baseband signal 370, product signal 382 from baseband signal 372, etc.), as part of a correlation operation to recover the code included in the input GNSS signal. Specifically, the product signal is accumulated and squared by correlator 356 to generate each of the correlation outputs 322/332 as a sequence of correlation outputs. Each correlation output represents the result of a correlation operation between a bit in the reference code 374 and a bit of the input code included in the input GNSS signal. The sequence of correlation outputs can indicate, for example, whether the reference code matches the input code, and whether the reference code and the input code are aligned with zero (or minimal) phase offset in between. In a case where the reference code matches the input code, and the phase offset between the codes is at a minimum, the sequence of correlation outputs can include peaks that represent the input code/reference code. The sequence of correlation outputs can be decoded by measurement output module 368 to generate a navigation message 369/371 as part of measurement outputs 326/328. The navigation message can include information, such as ephemeris data for calculating satellite position, speed, etc., which position engine 316 can use to perform a position and/or clock bias calculation operation.

The down-conversion operation at GNSS wireless receiver 312 can be configured by measurement engine 314. Specifically, frequency module 362 can output a nominal frequency 386 and a frequency offset 388a of replica carrier signal 355. Frequency module 362 can determine nominal frequency 386 of replica carrier signal 355 based on a target GNSS signal to be detected. For example, if GNSS wireless receiver 312 is to detect a BDS B1 signal, frequency module 362 can set nominal frequency 386 to 1561 MHz. If the GNSS receiver (e.g., a GNSS receiver of mobile device 105 in FIG. 1) is to detect a GAL E1 signal, frequency module 362 can set nominal frequency 386 to 1575.42 MHz. If GNSS wireless receiver 312 is to detect a BDS B2a signal and/or a GAL E5a signal, frequency module 362 can set nominal frequency 386 to 1176 MHz. In addition, due to the relative motion between the satellite and GNSS wireless receiver 312, a Doppler shift can be introduced to the carrier frequency of the GNSS signal. Frequency module 362 can introduce frequency offset 388 which can be added or subtracted from nominal frequency 386 to generate a compensated carrier frequency. Frequency synthesizer 358 can include arithmetic circuits to combine nominal frequency 386 with frequency offset 388 to compute the compensated carrier frequency, and a variable frequency oscillator (e.g., a voltage-controlled oscillator) to generate replica carrier signal 355 at the compensated carrier frequency.

FIG. 3B provides a simplified illustration of down-conversion. In a practical receiver, down-conversion can be performed in stages that include, for example: (1) analog down-conversion for each band (L1 or L2/L5), (2) fixed digital down-conversion for each sub-band (GPS L1, BDS B1, etc.), and (3) variable down-conversion on a per-satellite basis, taking into account the specific Doppler offset for each satellite.

In addition, the correlation operation at GNSS wireless receiver 312 can also be configured by measurement engine 314. Specifically, code module 364 can output reference code 374, as well as a code phase 390, to reference code generator 360. Reference code generator 360 can include a programmable delay chain to output reference code 374 with a phase added according to code phase 390. Code phase 390 can represent, for example, a phase shift between the input code of the input GNSS signal and a default reference phase of the reference code 374. The phase delay can represent the transit time of the input GNSS signal which can be used to determine the distance between the satellite and GNSS wireless receiver 312. Code phase 390 can be transmitted together with correlation output 322 as part of the first measurement output 326, which can be used by position engine 316 to determine, for example, a flight time and a distance between a satellite and the GNSS receiver.

Measurement engine 314 further includes acquisition and tracking module 366, which can perform an acquisition operation and a tracking operation to determine nominal frequency 386 and frequency offset 388 for frequency synthesizer 358, as well as reference code 374 and code phase 390 for reference code generator 360. Specifically, as part of the acquisition operation to determine nominal frequency 386 and frequency offset 388, acquisition and tracking module 366 can perform a coarse search of carrier frequency and frequency offsets based on supplying different carrier frequencies and different frequency offsets to frequency synthesizer 358 to perform down-conversions of the input GNSS signal. Based on the resulting sequences of correlation outputs, acquisition and tracking module 366 can determine a coarse carrier frequency and a coarse frequency offset. Acquisition and tracking module 366 can then use a high precision feedback loop, such as a phase locked loop (PLL), to further refine the carrier frequency (e.g., by adjusting/fine-tuning the coarse frequency offset) until the feedback loop locks, which can indicate that the frequency of replica carrier signal 355 matches (to within a certain uncertainty) the actual carrier frequency of the input GNSS signal. Frequency module 362 can then determine frequency offset 388, which can represent the Doppler frequency shift, based on the difference between the frequency of replica carrier signal 355 and the nominal carrier frequency.

In addition, as part of the acquisition operation to determine reference code 374 and code phase 390, acquisition and tracking module 366 can perform a coarse search of reference code and code offset based on supplying different reference codes and code phases to reference code generator 360 to perform correlation operations of the baseband signals. Based on the resulting sequences of correlation outputs, acquisition and tracking module 366 can determine the reference code which matches the input code (to within a certain uncertainty) and a coarse code phase. Acquisition and tracking module 366 can then use a high precision feedback loop, such as a delay locked loop (DLL), to further refine the code phase (e.g., by repeated, fine-grained adjustment) until the feedback loop locks, which can indicate that the phase of reference code 374 matches the phase of the input code in the input GNSS signal. The code phase can then be output as code phase 390.

Measurement engine 314 can store both frequency offset 388 and code phase 390 as part of the tracking information 324 in FIG. 3A, and can configure GNSS wireless receiver 312 with frequency offset 388 and code phase 390 for processing of first GNSS signal 320. In addition, acquisition and tracking module 366 can also derive frequency offset 392 and code phase 394 for processing of other GNSS signals, such as second GNSS signal 330, based on various factors such as carrier frequency ratio, code chipping rate ratio, relative receiver processing delay, etc. For example, measurement engine 314 can determine frequency offset 388 and code phase 390 from Galileo E1 signal, and then configure GNSS receiver with frequency offset 392 and code phase 394 for detection and processing of Galileo E5a signal. As another example, measurement engine 314 can determine frequency offset 388 and code phase 390 from BeiDou B1 signal, and then configure GNSS receiver with frequency offset 392 and code phase 394 for detection and processing of BeiDou B2a signal. Measurement output module 368 can also decode the correlation output 332 from the second GNSS signal 330 to generate navigation message 371.

The use of frequency offset 388 and code phase 390 from first GNSS signal 320 to derive frequency offset 392 and code phase 394 for processing of second GNSS signal 330 can be based on an assumption that the Galileo E1 and E5a signals, as well as the BeiDou B1 and B2a signals, are both received by the GNSS receiver at essentially the same distance from the same satellite and having the same relative motion with respect with the satellite. Meanwhile, using the Galileo E1 signal and/or BeiDou B1 signal to obtain the tracking information can greatly reduce the complexity and time for the acquisition and tracking operation compared with using, respectively, the Galileo E5a signal and BeiDou B2a signal, due to the much longer code length and chipping rate of the Galileo E5a signal and BeiDou B2a signal.

Moreover, measurement engine 314 can use an input GNSS signal, such as Galileo E1 signal or BeiDou B1 signal, to perform the acquisition and tracking operation even if the input GNSS signal is susceptible to interference by the wireless network signals transmitted by wireless transmitter 304. This can be due to the relatively short transmission time and narrow band of the wireless network signals, which reduce the likelihood and instances of interferences. Moreover, the frequency offset and code phase determination can be dominated by the portion of the input GNSS signal that is not interfered with (e.g., unaffected by) the wireless network signals. For example, even if noise peaks are introduced into the correlation outputs due to interference, acquisition and tracking module 366 can still use the contaminated correlation outputs to look for the closest reference code, and use the correlation outputs to determine the code offset.

Measurement engine 314 can also perform a consistency check by comparing the frequency offset and code phase with prior frequency offsets and code phases (e.g., from steering information) to confirm that the recently-determined frequency offset and code phase are unaffected by the interference of the wireless network signals. With such arrangements, measurement engine 314 can obtain tracking information 324 from GNSS signals that are subject to the interference of the wireless network signals. The acquisition of tracking information 324, in turn, enables the detection of other GNSS signals that are not (or less) subject to the interference by the wireless network signals, such as Galileo E5a and BeiDou B2a signals. Such arrangements allow SPS 302 to perform position calculation from a larger number of satellites to improve the accuracy of the position calculation.

On the other hand, although the interfered GNSS signals can be used for acquisition and tracking operations to determine tracking information, the interfered GNSS signals should not be used in the position calculation operation. Specifically, noise peaks in the correlation outputs of the interfered GNSS signals can introduce satellite range errors which, if used by position engine 316, can lead to substantial error in the determined position of the GNSS receiver.

To avoid position error caused by the interfered GNSS signals, measurement engine 314 can exclude first measurement outputs 326 derived from first GNSS signal 320, which may include navigation message 369 and code phase 390, from the position calculation operation at position engine 316, based on indication 336 from wireless transmitter 304. The measurement engine 314 and/or position engine 316 may, upon detecting the indication 336, infer that wireless transmitter 304 is active in the frequency band of the input GNSS signal 320. FIG. 3C illustrates example components of measurement output module 368. As shown in FIG. 3C, measurement output module 368 may include an indication detection module 393 and a measurement output forwarding module 395. Indication detection module 393 can detect indication 336 from wireless transmitter 304. Upon detecting indication 336, indication detection module 393 can generate a control signal 396 to measurement output forwarding module 395. In one example, control signal 396 can control measurement output forwarding module 395 to block first measurement outputs 326 if GNSS signal 320 is in the active frequency band of wireless transmitter 304, and to forward second measurement outputs 328, which may include navigation message 371 and code phase 394, if GNSS signal 330 is not in the active frequency band of wireless transmitter 304. In another example, control signal 396 can control measurement output forwarding module 395 to forward both first measurement outputs 326 and second measurement outputs 328 to position engine 316, but attach an indication of low reliability or other indicator with first measurement outputs 326 to cause position engine 316 not to include first measurement outputs 326 in the position calculation operation. In both examples, first measurement outputs 326 can be excluded from the position calculation operation.

In some examples, indication detection module 393 and measurement output forwarding module 395 can be part of position engine 316. In such examples, position engine 316 can receive first measurement outputs 326 and second measurement outputs 328 and, based on indication 336, exclude first measurement outputs 326 but include second measurement outputs 328 in the position calculation operation.

Wireless transmitter 304 can transmit indication 336 to indicate that it is active in the frequency band of the input GNSS signal under various scenarios. For example, wireless transmitter 304 can be actively transmitting a wireless network signal that is in the same frequency band as the input GNSS signal. As another example, wireless transmitter 304 can be actively transmitting a wireless network signal that is in a different frequency band from the input GNSS signal, but the intermodulation products or harmonics of the wireless network signal fall within the frequency band of the input GNSS signal, as in the case of LTE band 13 and band 14 with respect to BeiDou B1 and Galileo E1 signals, as described above in reference to FIG. 2B. As another example, wireless transmitter 304 can also be active in the frequency band if communication system 300 has established a wireless connection in that frequency bandwidth, for example, a base station, an access point, etc., even though wireless transmitter 304 is not actively transmitting a wireless network signal at the time that the GNSS signal is received at GNSS wireless receiver 312.

Figure 4:
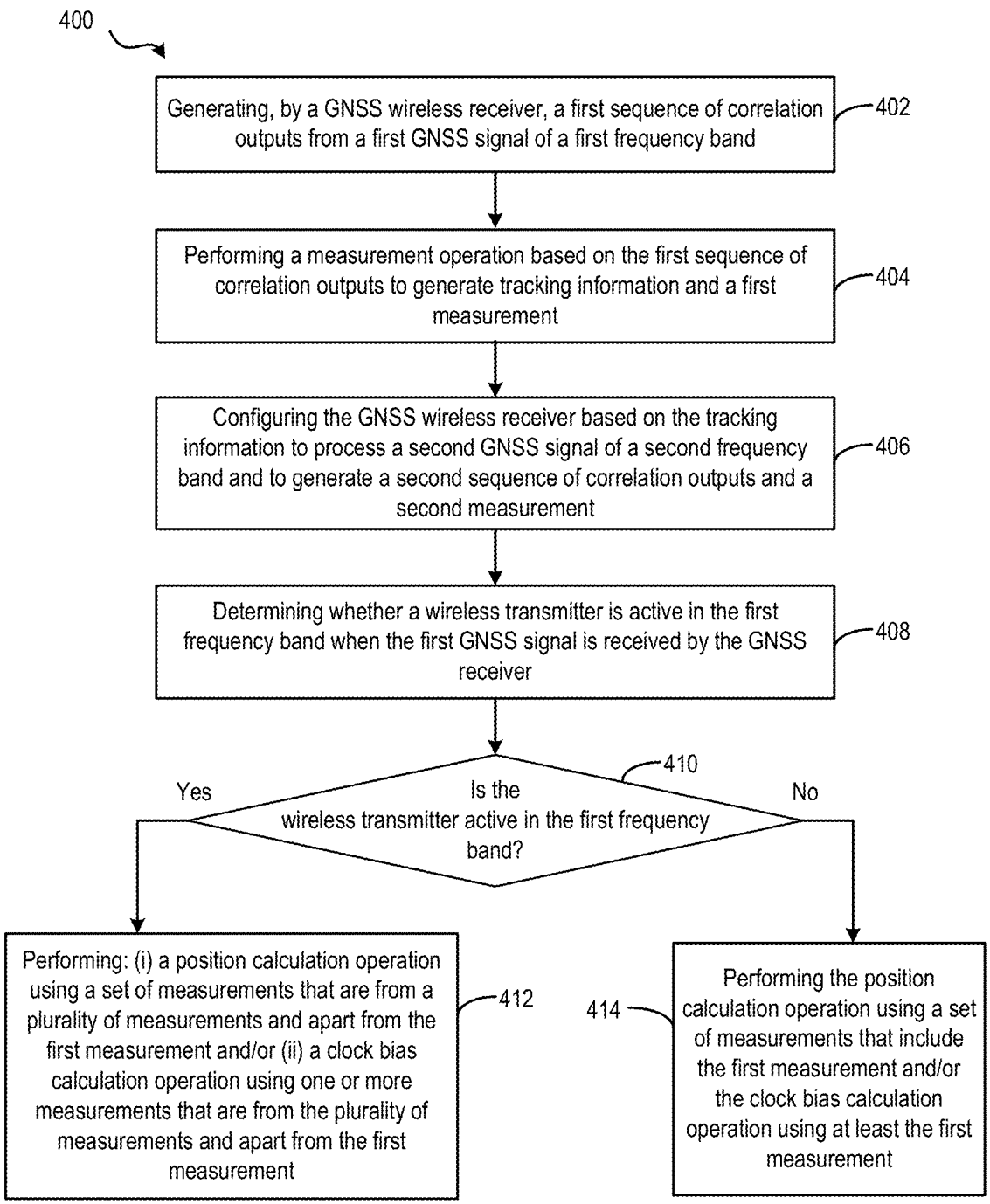
FIG. 4 illustrates a flowchart for implementing certain embodiments.

FIG. 4 illustrates a flowchart of a method 400 for performing a satellite-based positioning operation and/or a clock bias calculation operation. Method 400 can be performed by, for example, communication system 300 of FIG. 3A. In the embodiment of FIG. 4, the same engine (e.g., position engine 316) is configured to perform both position calculation and clock bias calculation. However, position calculation and clock bias calculation can be performed using separate hardware and/or software resources (different engines, different processing units, etc.).

Method 400 starts with step 402, in which GNSS wireless receiver 312 generates a first sequence of correlation outputs based on a first GNSS signal. The first GNSS signal can be of a first frequency band. In some instances, the first frequency band can correspond to IEEE L1 band of FIG. 2A. The first GNSS signal can include, for example, a BDS B1 signal, a BDS B1c signal, a GAL E1 signal, a GPS L1 signal, a GLO G1 signal, etc. The first GNSS signal may include a first carrier signal modulated by a first code, which can include a ranging code, a navigation message, etc. GNSS wireless receiver 312 can multiply the first GNSS signal with a first replica carrier signal to generate a first baseband signal, and then perform correlation operations between the first baseband signal and a reference code to generate the first sequence of correlation outputs.

In step 404, measurement engine 314 performs a measurement operation based on the first sequence of correlation outputs to generate tracking information and a first measurement (e.g., corresponding to the measurement outputs 326 in FIG. 3A). As part of the measurement operation, measurement engine 314 can determine a frequency shift of the first replica carrier signal (from the nominal frequency) needed to down-convert the first GNSS signal to the first baseband signal. The frequency of the replica carrier signal may be shifted from the nominal frequency due to Doppler shift caused by the relative movement between the satellite and the GNSS receiver. Measurement engine 314 can also search for the first code in the first baseband signal based on controlling the GNSS receiver to generate multiple first correlation outputs between the first baseband signal with multiple replicas of the first reference code of different phases. The measurement engine can determine a first phase shift of the code between the transmitted and received first GNSS signal based on identifying the phase of the replica of the first reference code that provides the maximum correlation among the multiple first correlation outputs. The first phase shift can be introduced by the flight time of the first GNSS signal between the satellite and the GNSS receiver. As a result of the measurement operation, measurement engine 314 can generate the tracking information including the frequency shift and first phase shift. Measurement engine 314 can also extract a first navigation message from the first sequence of correlation outputs based on identifying the first reference code. Measurement engine 314 may generate the first measurement based on the first phase shift and the first navigation message.

In step 406, measurement engine 314 can configure GNSS wireless receiver 312 based on the tracking information to process a second GNSS signal of a second frequency band and to generate a second sequence of correlation outputs. The second frequency band can encompass the IEEE L2 and L5 bands of FIG. 2A. The second GNSS signal may include, for example, BDS B2a signal, GAL E5a and E5b signals, GPS L2 and L5 signals, GLO G2 signal, etc. The second GNSS signal may have a frequency shift and a phase shift that can be derived from the frequency shift and the phase shift of first GNSS signal. As a result, the second correlation outputs can match a second code included in the second GNSS signal. Measurement engine 314 may also extract a second navigation message and determine a second phase shift from the second sequence of correlation outputs, then generate a second measurement (e.g., corresponding to the measurement outputs 328) based on the second navigation message and the second phase shift. The processing in step 406 can be repeated for one or more additional GNSS signals to generate additional correlation outputs and therefore a plurality of measurements, with the first measurement and the second measurement representing a subset of the plurality of measurements.

In step 408, measurement engine 314 (or position engine 316) determines whether wireless transmitter 304 is active in the first frequency band when GNSS wireless receiver 312 receives the first GNSS signal. The determination can be based on, for example, indication 336 from wireless transmitter 304. Wireless transmitter 304 can transmit indication 336 to indicate that it is active in the first frequency band under various scenarios. For example, wireless transmitter 304 can be actively transmitting a wireless signal in the first frequency band. As another example, wireless transmitter 304 can be actively transmitting a wireless signal that is in a different frequency band from the first frequency band, but the intermodulation products (e.g., second harmonics) of the wireless signal fall within the frequency band of the first GNSS signal. As another example, wireless transmitter 304 can also be active in the first frequency band if communication system 300 has established a wireless connection in the first frequency bandwidth, for example, a base station, an access point, etc., even though wireless transmitter 304 is not actively transmitting a wireless network signal at the time that the first GNSS signal is received at GNSS wireless receiver 312.

If the wireless transmitter is active in the first frequency band (in step 410), measurement engine 314 can exclude the first measurement output from a position calculation operation at position engine 316 and/or from a clock bias calculation, in step 412. The exclusion can be based on, for example, not providing the first measurement to position engine 316, attaching an indication of low reliability to enable position engine 316 to ignore the first measurement, transmitting a set of constant or default values to the position engine to cause the position engine to exclude the set of constant or default values from the position calculation operation and/or the clock bias calculation operation, transmitting a previously-transmitted measurement to the position engine to cause the position engine to exclude the previously-transmitted measurement output from the position and/or clock bias calculation operation, etc. On the other hand, if the wireless transmitter is not active in the first frequency band (in step 410), measurement engine 314 can forward the first measurement to position engine 316 to perform the position calculation and/or clock bias calculation operation, in step 414. The position calculation operation may include, for example, determining the position of the GNSS receiver based on the position of the satellites and the measured distances from the receiver, where the satellite positions and measured distances are determined using a set of measurements that are from the plurality of measurements and apart from the first measurement). The clock bias calculation operation can be performed using one or more measurements that are from the plurality of measurements and apart from the first measurement and may include, for example, calculating a flight time based on time of transmission and time of arrival of a particular GNSS signal, determining an expected flight time based on a known position of the GNSS wireless receiver 312 (e.g., the most recently calculated position prior to receiving the particular GNSS signal), and determining the clock bias by comparing the expected flight time to the calculated flight time. Alternatively, clock bias may be calculated by comparing expected time of arrival with measured time of arrival.

In both steps 412 and 414, the position calculation operation and/or clock bias calculation operation can be based on the second measurement generated in step 406. For example, in step 412, the set of measurements used to perform the position calculation operation can include the second measurement but not the first measurement(e.g., the second measurement in combination with at least two additional measurements besides the first measurement), whereas in step 414, the position calculation operation can be based on a combination of the first measurement, the second measurement, plus at least a third measurement. Similarly, the clock bias calculation operation in step 412 can be performed using at least the second measurement, but not the first measurement, whereas the clock bias calculation operation in step 414 can be performed using at least the first measurement.

Figure 5:
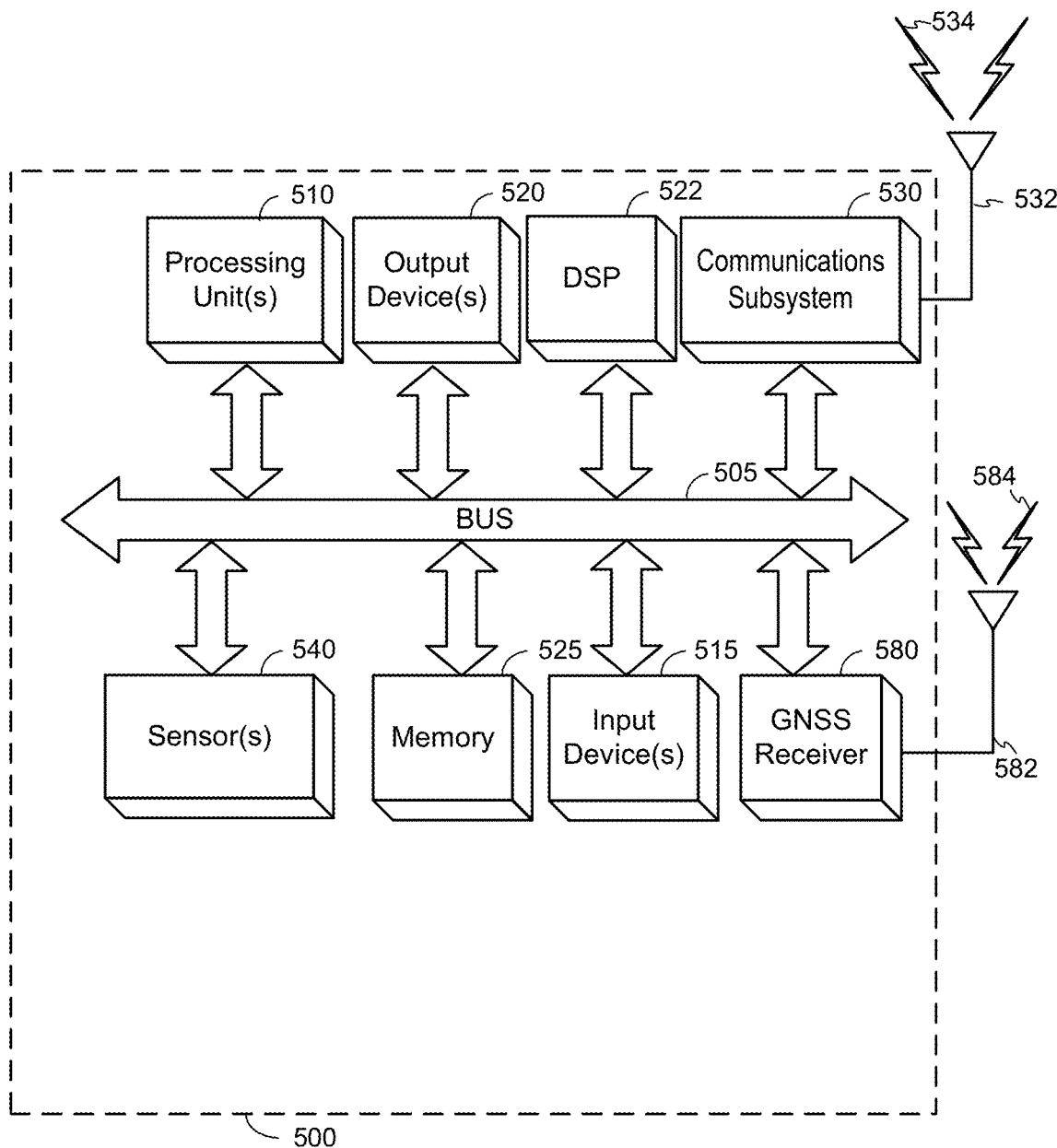
FIG. 5 illustrates an example of a computing system in which one or more embodiments may be implemented.

FIG. 5 provides a schematic illustration of one embodiment of a computer system 500 that can perform various blocks of the methods provided by various embodiments. A computer system as illustrated in FIG. 5 may be incorporated as part of the previously described computerized devices, such as mobile device 105. For instance, functions of measurement engine 314 and position engine 316 may be performed by a general-purpose processor implemented as part of computer system 500. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processing units 510, including without limitation one or more general-purpose processors and/or one or more special-purpose processors (such as digital signal processing (DSP) chips, graphics acceleration processors, video decoders, and/or the like). As shown in FIG. 5, some embodiments may have a separate DSP 522, depending on desired functionality.

Computer system 500 may further include one or more input devices 515, which can include without limitation a mouse, a keyboard, remote control, and/or the like; and one or more output devices 520, which can include without limitation a display device, a printer, and/or the like. As used herein, a controller can include functionality of a processor (e.g., a processing unit 510).

The computer system 500 may further include (and/or be in communication with) one or more non-transitory storage devices that operate as memory 525. Such storage devices can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updatable and/or the like. Such storage devices may be configured to implement any appropriate data stores, including without limitation, various file systems, database structures, and/or the like. In some embodiments, the memory 525 is configured as a working memory implemented using a RAM or ROM device.

The computer system 500 might also include a communications subsystem 530, which can include without limitation a modem, a network card (wireless or wired), an infrared communication device, a wireless communication device, and/or a chipset (such as a Bluetooth™ device, an 802.11 device, a Wi-Fi device, a WiMax device, cellular communication device, GSM, CDMA, WCDMA, LTE, LTE-A, LTE-U, etc.), and/or the like. The communications subsystem 530 may permit data to be exchanged (e.g., via transmission and reception of wireless network signals) with a network, with other computer systems, and/or with any other devices described herein. Location determination (e.g., using a position calculation operation) and/or other determinations based on wireless communication may be provided in the processing unit(s) 510 and/or a wireless communication device of the communications subsystem 530. In some embodiments, communications subsystem 530 is configured to carry out wireless communication via one or more wireless communication antenna(s) 532 that send and/or receive wireless signals 534. For example, wireless signals 534 may include the signals 140 and 150 shown in FIG. 1). According to some embodiments, the wireless communication antenna(s) 532 may comprise a plurality of discrete antennas, antenna arrays, or any combination thereof.

Depending on desired functionality, the communications subsystem 230 may comprise a separate receiver and transmitter, or any combination of transceivers, transmitters, and/or receivers to communicate with base stations and other terrestrial transceivers, such as wireless devices and access points. The computer system 500 may use communications subsystem 230 to communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE Y302.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000 is described in documents from a consortium named "3rd Generation Partnership Project X3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The computer system 500 can further include sensor(s) 540. Sensors 540 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), radar, light detection and ranging (LIDAR), ultrasonic, and the like), some of which may be used to obtain position-related measurements and/or other information.

Computer system 500 may also include a GNSS receiver 580 capable of receiving signals 584 from one or more GNSS satellites using an antenna 582 (which could be the same as antenna 532). GNSS receiver 580 may correspond to GNSS wireless receiver 312 in the example of FIGS. 3A and 3B. Positioning based on GNSS signal measurements can be utilized to complement and/or incorporate the techniques described herein. The GNSS receiver 580 (or a component configured to process GNSS signals acquired by the GNSS receiver 580, such as position engine 316 in FIG. 3A) can extract a position of the computer system 500 using GNSS signals of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 580 can be used with various augmentation systems (e.g., a Satellite Based Augmentation System (SBAS)) that may be associated with or otherwise enabled for use with one or more global and/or regional navigation satellite systems, such as, e.g., WAAS, EGNOS, Multi-functional Satellite Augmentation System (MSAS), Geo Augmented Navigation system (GAGAN), and/or the like.

Although GNSS receiver 580 is illustrated in FIG. 5 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 510, DSP 522, and/or a processing unit within the communications subsystem 530 (e.g., in a modem). A GNSS receiver may also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 510 or DSP 522. Accordingly, GNSS receiver 580 may encompass the functionality described above with respect to the SPS 302.

The computer system 500 can comprise software elements, including an operating system, device drivers, executable libraries, and/or other code, such as one or more application programs. Such software elements can include computer programs provided by various embodiments, and/or may be designed to implement methods, and/or configure systems, as provided by other embodiments described herein. Merely by way of example, one or more procedures described with respect to the method(s) discussed above (e.g., the method of FIG. 4) might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium incorporated within computer system 500 (e.g., stored on memory 525). In other embodiments, the storage medium might be separate from computer system 500 (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments. According to a set of embodiments, some or all of the procedures of such methods are performed by the computer system 500 in response to processor 510 executing one or more sequences of one or more instructions (which might be incorporated into an operating system and/or other code, such as an application program) contained in working memory (e.g., in a volatile memory device that is part of memory 525). Such instructions may be read into the working memory from another computer-readable medium, such as one or more non-transitory storage device(s) that form memory 525. Merely by way of example, execution of the sequences of instructions contained in the working memory might cause the processing unit(s) 510 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks. Volatile media include, for example, dynamic memory.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processing unit(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 (and/or components thereof) generally will receive signals, and the bus 505 then might carry the signals (and/or the data, instructions, etc. carried by the signals) to the working memory 535, from which the processing unit(s) 510 retrieve and execute the instructions. The instructions received by working memory may optionally be stored on a non-transitory storage device either before or after execution by the processing unit(s) 510.

It should further be understood that the components of computer system 500 can be distributed across a network. For example, some processing may be performed in one position using a first processor while other processing may be performed by another processor remote from the first processor. Other components of computer system 500 may be similarly distributed. As such, computer system 500 may be interpreted as a distributed computing system that performs processing in multiple positions. In some instances, computer system 500 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

A satellite-based positioning system typically includes a system of transmitters positioned to enable entities to determine their position on or above the Earth based, at least in part, on signals received from the transmitters. Such a transmitter typically transmits a signal marked with a repeating pseudo-random noise (PN) code. In a particular example, such transmitters may be located on Earth orbiting space vehicles (SV). For example, an SV in a constellation of the Global Navigation Satellite System (GNSS) such as Global Positioning System (GPS), Global Navigation Satellite System (GLONASS), etc. may transmit a signal marked with a PN code that is distinguishable from PN codes transmitted by other SVs in the constellation.

In accordance with certain aspects, the techniques presented herein are not restricted to global systems (e.g., GNSS). For example, the techniques provided herein may be applied to or otherwise adapted for use in various regional systems, such as, e.g., Quasi-Zenith Satellite System (QZSS) over Japan, Indian Regional Navigational Satellite System (IRNSS) over India, etc., and/or various augmentation systems (e.g., an Satellite Based Augmentation System (SBAS)) that may be associated with or otherwise adapted for use with one or more global and/or regional navigation satellite systems. By way of example but not limitation, an SBAS may include an augmentation system(s) that provide integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Such SBAS may, for example, transmit GNSS and/or GNSS-like signals that may also be interfered with by certain wireless communication signals, etc. Thus, as used herein, an SPS may include any combination of one or more global and/or regional navigation satellite systems and/or augmentation systems.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

In view of this description embodiments may include different combinations of features. Implementation examples are described in the following numbered clauses:

Clause 1. An apparatus, comprising:
a wireless transmitter;
a measurement engine configured to generate a plurality of measurements based on Global Navigation Satellite System (GNSS) signals received by a GNSS wireless receiver, wherein the plurality of measurements includes a first measurement generated based on a first GNSS signal; and
one or more processors configured to:
determine whether the wireless transmitter is active in a first frequency band when the GNSS wireless receiver receives the first GNSS signal, the first frequency band being a frequency band of the first GNSS signal; and
responsive to determining that the wireless transmitter is active in the first frequency band when the GNSS wireless receiver receives the first GNSS signal, perform: (i) a position calculation operation using a set of measurements that are from the plurality of measurements and apart from the first measurement or (ii) a clock bias calculation operation using one or more measurements that are from the plurality of measurements and apart from the first measurement.

Clause 2. The apparatus of clause 1, wherein the measurement engine is further configured to generate tracking information based on the first GNSS signal, and wherein the tracking information comprises at least one of: a code phase of a first code included in the first GNSS signal, or a carrier frequency offset of the first GNSS signal.

Clause 3. The apparatus of clause 2, wherein the measurement engine is further configured to:
perform a consistency check of the tracking information, wherein a result of the consistency check indicates whether the code phase of the first code and the carrier frequency offset of the first GNSS signal are affected by interference from a wireless network signal transmitted by the wireless transmitter; and
based on the result of the consistency check indicating that the code phase of the first code and the carrier frequency offset of the first GNSS signal are unaffected by interference, configure the GNSS wireless receiver using the tracking information to detect a second GNSS signal of a second frequency band.

Clause 4. The apparatus of clause 2 or 3, wherein the measurement engine is further configured to:
receive, from the GNSS wireless receiver after the GNSS wireless receiver has been configured using the tracking information, a sequence of correlation outputs generated using a second GNSS signal;
perform a measurement operation based on the sequence of correlation outputs to generate a code phase;
decode the sequence of correlation outputs to generate a navigation message; and
forward the code phase and the navigation message to a position engine implemented by the one or more processors; and
wherein to perform the position calculation operation, the position engine is configured to:
determine a distance between a satellite and the GNSS wireless receiver based on the code phase;
determine a position of the satellite based on the navigation message; and determine the position of the GNSS wireless receiver based on the distance and the position of the satellite.

Clause 5. The apparatus of any of clauses 2-4, wherein: the GNSS wireless receiver includes a first multiplier and a second multiplier and is configured to:
  multiply, using the first multiplier, the first GNSS signal with a carrier signal of the first frequency band to generate a first baseband signal; and
  multiply, using the second multiplier, the first baseband signal with a reference code to generate first correlation outputs;
  a frequency of the carrier signal is configured based on the carrier frequency offset of the first GNSS signal; and
  a code phase of the reference code is configured based on the code phase of the first code.

Clause 6. The apparatus of clause 5, wherein the GNSS wireless receiver includes:
  a frequency synthesizer configured based on the carrier frequency offset to supply the carrier signal to the first multiplier; and
  a delay chain configured based on the code phase of the first code to set the code phase of the reference code.

Clause 7. The apparatus of clause 5 or 6, wherein the measurement engine is configured to:
  control the GNSS wireless receiver to perform multiple correlation operations, each correlation operation of the multiple correlation operations being between the first baseband signal and a reference code with a different code phase; and
  identify, based on the correlation outputs of the multiple correlation operations, a code phase that provides a maximum correlation.

Clause 8. The apparatus of any of clauses 5-7, wherein the measurement engine further includes a delay locked loop (DLL) configured to adjust the code phase of the reference code to match the code phase of the first code.

Clause 9. The apparatus of any of clauses 5-8, wherein the measurement engine includes a phase locked loop (PLL) configured to adjust the frequency of the carrier signal to match a carrier frequency of the first GNSS signal.

Clause 10. The apparatus of any of clauses 1-9, wherein the one or more processors are configured to, responsive to determining that the wireless transmitter is active in the first frequency band when the GNSS wireless receiver receives the first GNSS signal, cause a position engine implemented by the one or more processors to use the set of measurements to perform the position calculation operation, based on the one or more processors performing at least one of:
  forwarding the set of measurements to the position engine without forwarding the first measurement,
  marking the first measurement with an indicator, the position engine being configured to exclude the first measurement from the position calculation operation based on the indicator,
  transmitting a set of constant or default values to the position engine instead of the first measurement, the position engine being configured to exclude the set of constant or default values from the position calculation operation, or
  transmitting a previously-transmitted measurement to the position engine instead of the first measurement, the position engine being configured to exclude the previously-transmitted measurement from the position calculation operation.

Clause 11. The apparatus of any of clauses 1-10, wherein the one or more processors are configured to:
  receive the plurality of measurements from the measurement engine; and
  responsive to determining that the wireless transmitter is active in the first frequency band when the GNSS wireless receiver receives the first GNSS signal, perform the position calculation operation using the set of measurements that are from the plurality of measurements and apart from the first measurement.

Clause 12. The apparatus of any of clauses 1-11, wherein to determine that the wireless transmitter is active in the first frequency band, the one or more processors are configured to determine that the wireless transmitter transmits a wireless network signal with a harmonic component that has a frequency in the first frequency band, the wireless network signal being in a second frequency band.

Clause 13. The apparatus of any of clauses 1-11, wherein to determine that the wireless transmitter is active in the first frequency band, the one or more processors are configured to determine that the wireless transmitter transmits a wireless network signal in the first frequency band.

Clause 14. The apparatus of any of clauses 1-11, wherein to determine that the wireless transmitter is active in the first frequency band, the one or more processors are configured to determine that a communication channel over the first frequency band has been established between the wireless transmitter and a base station or an access point.

Clause 15. The apparatus of any of clauses 1-14, wherein the first frequency band is associated with a Wi-Fi signal.

Clause 16. The apparatus of any of clauses 1-14, wherein the first frequency band is associated with one of: second harmonics of Long Term Evolution (LTE) band 13, or second harmonics of LTE band 14.

Clause 17. The apparatus of clause 16, wherein the first GNSS signal comprises a Galileo E1 signal.

Clause 18. The apparatus of clause 16, wherein the first GNSS signal comprises a BeiDou (BDS) B1 signal.

Clause 19. The apparatus of clause 16, wherein the first GNSS signal comprises a Global Navigation Satellite System (GLONASS) G1 signal.

Clause 20. The apparatus of clause 16, wherein the first GNSS signal comprises a Global Positioning System (GPS) L1 signal.

Clause 21. The apparatus of any of clauses 1-20, wherein the one or more processors are configured to, responsive to determining that the wireless transmitter is active in the first frequency band when the GNSS wireless receiver receives the first GNSS signal, perform the clock bias calculation operation using the one or more measurements that are from the plurality of measurements and apart from the first measurement.

Clause 22. The apparatus of clause 21, wherein the one or more processors are configured to perform the clock bias calculation operation using a measurement generated based on a single GNSS signal, in combination with a known position of the GNSS receiver.

Clause 23. The apparatus of clause 21, wherein the apparatus is configured to transmit a vehicle-to-everything (V2X) message during a time slot determined using a local clock after the local clock has been corrected according to a result of the clock bias calculation operation.

Clause 24. A method, comprising:
  generating, using a measurement engine, a plurality of measurements based on Global Navigation Satellite System (GNSS) signals received by a GNSS wireless receiver, wherein the plurality of measurements includes a first measurement generated based on a first GNSS signal;

determining, by one or more processors, whether a wireless transmitter is active in a first frequency band when the GNSS wireless receiver receives the first GNSS signal, the first frequency band being a frequency band of the first GNSS signal; and responsive to determining that the wireless transmitter is active in the first frequency band when the GNSS wireless receiver receives the first GNSS signal, performing: (i) a position calculation operation using a set of measurements that are from the plurality of measurements and apart from the first measurement or (ii) a clock bias calculation operation using one or more measurements that are from the plurality of measurements and apart from the first measurement.

Clause 25. The method of clause 24, further comprising:
determining, by the measurement engine, tracking information based on the first GNSS signal, wherein the tracking information comprises at least one of: a code phase of a first code included in the first GNSS signal, or a carrier frequency offset of the first GNSS signal.

Clause 26. The method of clause 25, further comprising:
performing, by the measurement engine, a consistency check of the tracking information, wherein a result of the consistency check indicates whether the code phase of the first code and the carrier frequency offset of the first GNSS signal are affected by interference from a wireless network signal transmitted by the wireless transmitter; and based on the result of the consistency check indicating that the code phase of the first code and the carrier frequency offset of the first GNSS signal are unaffected by interference, configuring the GNSS wireless receiver using the tracking information to detect a second GNSS signal of a second frequency band.

Clause 27. The method of clause 25 or 26, further comprising:
receiving, from the GNSS wireless receiver after the GNSS wireless receiver has been configured using the tracking information, a sequence of correlation outputs generated using a second GNSS signal;
performing a measurement operation based on the sequence of correlation outputs to generate a code phase;
decoding the sequence of correlation outputs to generate a navigation message;
determining a distance between a satellite and the GNSS wireless receiver based on the code phase;
determining a position of the satellite based on the navigation message; and
determining the position of the GNSS wireless receiver based on the distance and the position of the satellite.

Clause 28. The method of any of clauses 25-27, wherein the GNSS wireless receiver includes a first multiplier and a second multiplier, the method further comprising:
multiplying, using the first multiplier, the first GNSS signal with a carrier signal of the first frequency band to generate a first baseband signal; and
multiplying, using the second multiplier, the first baseband signal with a reference code to generate first correlation outputs;
configuring a frequency of the carrier signal based on the carrier frequency offset of the first GNSS signal; and
configuring a code phase of the reference code based on the code phase of the first code.

Clause 29. The method of clause 28, further comprising:
supplying, by a frequency synthesizer configured based on the carrier frequency offset, the carrier signal to the first multiplier; and
setting the code phase of the reference code using a delay chain configured based on the code phase of the first code.

Clause 30. The method of clause 28 or 29, further comprising:
controlling, by the measurement engine, the GNSS wireless receiver to perform multiple correlation operations, each correlation operation of the multiple correlation operations being between the first baseband signal and a reference code with a different code phase; and
identifying, based on the correlation outputs of the multiple correlation operations, a code phase that provides a maximum correlation.

Clause 31. The method of any of clauses 28-30, further comprising:
adjusting, using a delay locked loop (DLL), the code phase of the reference code to match the code phase of the first code.

Clause 32. The method of any of clauses 28-31, further comprising:
adjusting, using a phase locked loop (PLL), the frequency of the carrier signal to match a carrier frequency of the first GNSS signal.

Clause 33. The method of any of clauses 24-32, wherein the one or more processors implement a position engine configured to perform the position calculation operation, the method further comprising causing the position engine to use the set of measurements to perform the position calculation operation based on at least one of:
forwarding the set of measurements to the position engine without forwarding the first measurement,
marking the first measurement with an indicator to cause the position engine to exclude the first measurement from the position calculation operation,
transmitting a set of constant or default values to the position engine instead of the first measurement to cause the position engine to exclude the set of constant or default values from the position calculation operation, or
transmitting a previously-transmitted measurement to the position engine instead of the first measurement to cause the position engine to exclude the previously-transmitted measurement from the position calculation operation.

Clause 34. The method of any of clauses 24-33, further comprising:
receiving, by the one or more processors, the plurality of measurements from the measurement engine; and
responsive to determining that the wireless transmitter is active in the first frequency band when the GNSS wireless receiver receives the first GNSS signal, performing, by the one or more processors, the position calculation operation using the set of measurements that are from the plurality of measurements and apart from the first measurement.

Clause 35. The method of any of clauses 24-34, wherein determining that the wireless transmitter is active in the first frequency band comprises determining that the wireless transmitter transmits a wireless network signal with a harmonic component that has a frequency in the first frequency band, the wireless network signal being in in a second frequency band.

Clause 36. The method of any of clauses 24-34, wherein determining that the wireless transmitter is active in the first frequency band comprises determining that the wireless transmitter transmits a wireless network signal in the first frequency band.

Clause 37. The method of any of clauses 24-34, wherein determining that the wireless transmitter is active in the first frequency band comprises determining that a communication channel over the first frequency band has been established between the wireless transmitter and a base station or an access point.

Clause 38. The method of any of clauses 24-37, wherein the first frequency band is associated with a Wi-Fi signal.

Clause 39. The method of any of clauses 24-37, wherein the first frequency band is associated one of: second harmonics of Long Term Evolution (LTE) band 13, or second harmonics of LTE band 14.

Clause 40. The method of clause 39, wherein the first GNSS signal comprises a Galileo E1 signal.

Clause 41. The method of clause 39, wherein the first GNSS signal comprises a BeiDou (BDS) B1 signal.

Clause 42. The method of clause 39, wherein the first GNSS signal comprises a Global Navigation Satellite System (GLONASS) G1 signal.

Clause 43. The method of clause 39, wherein the first GNSS signal comprises a Global Positioning System (GPS) L1 signal.

Clause 44. The method of any of clauses 24-43, further comprising:
responsive to determining that the wireless transmitter is active in the first frequency band when the GNSS wireless receiver receives the first GNSS signal, performing the clock bias calculation operation using the one or more measurements that are from the plurality of measurements and apart from the first measurement.

Clause 45. The method of clause 44, further comprising:
performing the clock bias calculation operation using a measurement generated based on a single GNSS signal, in combination with a known position of the GNSS receiver.

Clause 46. The apparatus of clause 44, further comprising:
transmitting a vehicle-to-everything (V2X) message during a time slot determined using a local clock after the local clock has been corrected according to a result of the clock bias calculation operation.

Clause 47. A non-transitory computer readable medium containing instructions that, when executed by one or more processors, cause the one or more processors to:
generate a plurality of measurements based on Global Navigation Satellite System (GNSS) signals received by a GNSS wireless receiver, wherein the plurality of measurements includes a first measurement generated based on a first GNSS signal;
determine whether a wireless transmitter is active in a first frequency band when the GNSS wireless receiver receives the first GNSS signal, the first frequency band being a frequency band of the first GNSS signal; and
responsive to determining that the wireless transmitter is active in the first frequency band when the GNSS wireless receiver receives the first GNSS signal, perform: (i) a position calculation operation using a set of measurements that are from the plurality of measurements and apart from the first measurement or (ii) a clock bias calculation operation using one or more measurements that are from the plurality of measurements and apart from the first measurement.

Clause 48. An apparatus comprising:
means for generating a plurality of measurements based on Global Navigation Satellite System (GNSS) signals received by a GNSS wireless receiver, wherein the plurality of measurements includes a first measurement generated based on a first GNSS signal;
means for determining whether a wireless transmitter is active in a first frequency band when the GNSS wireless receiver receives the first GNSS signal, the first frequency band being a frequency band of the first GNSS signal; and
means for responsive to determining that the wireless transmitter is active in the first frequency band when the GNSS wireless receiver receives the first GNSS signal, performing: (i) a position calculation operation using a set of measurements that are from the plurality of measurements and apart from the first measurement or (ii) a clock bias calculation operation using one or more measurements that are from the plurality of measurements and apart from the first measurement.

What is claimed is:

1. An apparatus, comprising:
a wireless transmitter configured to transmit wireless network signals;
a measurement engine configured to generate a plurality of measurements based on Global Navigation Satellite System (GNSS) signals received by a GNSS wireless receiver, wherein the plurality of measurements includes a first measurement generated based on a first GNSS signal; and
one or more processors configured to:
determine whether the wireless transmitter is actively transmitting at least one wireless network signal having a frequency or harmonic frequency in a first frequency band during a time when the GNSS wireless receiver is receiving the first GNSS signal, the first frequency band being a frequency band of the first GNSS signal; and
responsive to determining that the wireless transmitter is actively transmitting at least one wireless network signal having a frequency or harmonic frequency in the first frequency band during the time when the GNSS wireless receiver is receiving the first GNSS signal, perform one or more of the following operations after the measurement engine has generated the first measurement and at least one additional measurement of the plurality of measurements: (i) a position calculation operation using a set of measurements that are from the plurality of measurements and apart from the first measurement or (ii) a clock bias calculation operation using one or more measurements that are from the plurality of measurements and apart from the first measurement.

2. The apparatus of claim 1, wherein the measurement engine is further configured to generate tracking information based on the first GNSS signal, and wherein the tracking information comprises at least one of: a code phase of a first code included in the first GNSS signal, or a carrier frequency offset of the first GNSS signal.

3. The apparatus of claim 2, wherein the measurement engine is further configured to:
perform a consistency check of the tracking information, wherein a result of the consistency check indicates whether the code phase of the first code and the carrier frequency offset of the first GNSS signal are affected by interference from a wireless network signal transmitted by the wireless transmitter; and based on the result of the consistency check indicating that the code phase of the first code and the carrier frequency offset of the first GNSS signal are unaffected by interference, configure the GNSS wireless receiver using the tracking information to detect a second GNSS signal of a second frequency band.

4. The apparatus of claim 2, wherein the measurement engine is further configured to:
receive, from the GNSS wireless receiver after the GNSS wireless receiver has been configured using the tracking information, a sequence of correlation outputs generated using a second GNSS signal;
perform a measurement operation based on the sequence of correlation outputs to generate a code phase;
decode the sequence of correlation outputs to generate a navigation message; and
forward the code phase and the navigation message to a position engine implemented by the one or more processors; and
wherein to perform the position calculation operation, the position engine is configured to:
determine a distance between a satellite and the GNSS wireless receiver based on the code phase;
determine a position of the satellite based on the navigation message; and
determine the position of the GNSS wireless receiver based on the distance and the position of the satellite.

5. The apparatus of claim 2, wherein:
the GNSS wireless receiver includes a first multiplier and a second multiplier and is configured to:
multiply, using the first multiplier, the first GNSS signal with a carrier signal of the first frequency band to generate a first baseband signal; and
multiply, using the second multiplier, the first baseband signal with a reference code to generate first correlation outputs;
a frequency of the carrier signal is configured based on the carrier frequency offset of the first GNSS signal; and
a code phase of the reference code is configured based on the code phase of the first code.

6. The apparatus of claim 5, wherein the GNSS wireless receiver includes:
a frequency synthesizer configured based on the carrier frequency offset to supply the carrier signal to the first multiplier; and
a delay chain configured based on the code phase of the first code to set the code phase of the reference code.

7. The apparatus of claim 5, wherein the measurement engine is configured to:
control the GNSS wireless receiver to perform multiple correlation operations, each correlation operation of the multiple correlation operations being between the first baseband signal and a reference code with a different code phase; and
identify, based on correlation outputs of the multiple correlation operations, a code phase that provides a maximum correlation.

8. The apparatus of claim 5, wherein the measurement engine further includes a delay locked loop (DLL) configured to adjust the code phase of the reference code to match the code phase of the first code.

9. The apparatus of claim 5, wherein the measurement engine includes a phase locked loop (PLL) configured to adjust the frequency of the carrier signal to match a carrier frequency of the first GNSS signal.

10. The apparatus of claim 1, wherein the one or more processors are configured to, responsive to determining that the wireless transmitter is actively transmitting at least one wireless network signal having a frequency or harmonic frequency in the first frequency band during the time when the GNSS wireless receiver is receiving the first GNSS signal, cause a position engine implemented by the one or more processors to use the set of measurements to perform the position calculation operation, based on the one or more processors performing at least one of:
forwarding the set of measurements to the position engine without forwarding the first measurement,
marking the first measurement with an indicator, the position engine being configured to exclude the first measurement from the position calculation operation based on the indicator,
transmitting a set of constant or default values to the position engine instead of the first measurement, the position engine being configured to exclude the set of constant or default values from the position calculation operation, or
transmitting a previously-transmitted measurement to the position engine instead of the first measurement, the position engine being configured to exclude the previously-transmitted measurement from the position calculation operation.

11. The apparatus of claim 1, wherein the one or more processors are configured to:
receive the plurality of measurements from the measurement engine; and
responsive to determining that the wireless transmitter is actively transmitting at least one wireless network signal having a frequency or harmonic frequency in the first frequency band during the time when the GNSS wireless receiver is receiving the first GNSS signal, perform the position calculation operation using the set of measurements that are from the plurality of measurements and apart from the first measurement.

12. The apparatus of claim 1, wherein to determine that the wireless transmitter is actively transmitting at least one wireless network signal having a frequency or harmonic frequency in the first frequency band, the one or more processors are configured to determine that the wireless transmitter transmits a wireless network signal with a harmonic component that has a frequency in the first frequency band, the wireless network signal being in a second frequency band.

13. The apparatus of claim 1, wherein to determine that the wireless transmitter is actively transmitting at least one wireless network signal having a frequency or harmonic frequency in the first frequency band, the one or more processors are configured to determine that the wireless transmitter transmits a wireless network signal in the first frequency band.

14. The apparatus of claim 1, wherein to determine that the wireless transmitter is actively transmitting at least one wireless network signal having a frequency or harmonic frequency in the first frequency band, the one or more processors are configured to determine that a communication channel over the first frequency band has been established between the wireless transmitter and a base station or an access point.

15. The apparatus of claim 1, wherein the first frequency band is associated with a Wi-Fi signal.

16. The apparatus of claim 1, wherein the first frequency band is associated with one of: second harmonics of Long Term Evolution (LTE) band 13, or second harmonics of LTE band 14.

17. The apparatus of claim 16, wherein the first GNSS signal comprises a Galileo E1 signal.

18. The apparatus of claim 16, wherein the first GNSS signal comprises a BeiDou (BDS) B1 signal.

19. The apparatus of claim 16, wherein the first GNSS signal comprises a Global Navigation Satellite System (GLONASS) G1 signal.

20. The apparatus of claim 16, wherein the first GNSS signal comprises a Global Positioning System (GPS) L1 signal.

21. The apparatus of claim 1, wherein the one or more processors are configured to, responsive to determining that the wireless transmitter is actively transmitting at least one wireless network signal having a frequency or harmonic frequency in the first frequency band during the time when the GNSS wireless receiver is receiving the first GNSS signal, perform the clock bias calculation operation using the one or more measurements that are from the plurality of measurements and apart from the first measurement.

22. The apparatus of claim 21, wherein the one or more processors are configured to perform the clock bias calculation operation using a measurement generated based on a single GNSS signal, in combination with a known position of the GNSS receiver.

23. The apparatus of claim 21, wherein the apparatus is configured to transmit a vehicle-to-everything (V2X) message during a time slot determined using a local clock after the local clock has been corrected according to a result of the clock bias calculation operation.

24. A method, comprising:
generating, using a measurement engine, a plurality of measurements based on Global Navigation Satellite System (GNSS) signals received by a GNSS wireless receiver, wherein the plurality of measurements includes a first measurement generated based on a first GNSS signal;
determining, by one or more processors, whether a wireless transmitter is actively transmitting at least one wireless network signal having a frequency or harmonic frequency in a first frequency band during a time when the GNSS wireless receiver is receiving the first GNSS signal, the first frequency band being a frequency band of the first GNSS signal; and
responsive to determining that the wireless transmitter is actively transmitting at least one wireless network signal having a frequency or harmonic frequency in the first frequency band during the time when the GNSS wireless receiver is receiving the first GNSS signal, performing one or more of the following operations after generating, using the measurement engine, the first measurement and at least one additional measurement of the plurality of measurements: (i) a position calculation operation using a set of measurements that are from the plurality of measurements and apart from the first measurement or (ii) a clock bias calculation operation using one or more measurements that are from the plurality of measurements and apart from the first measurement.

25. The method of claim 24, further comprising:
determining, by the measurement engine, tracking information based on the first GNSS signal, wherein the tracking information comprises at least one of: a code phase of a first code included in the first GNSS signal, or a carrier frequency offset of the first GNSS signal.

26. The method of claim 25, further comprising:
performing, by the measurement engine, a consistency check of the tracking information, wherein a result of the consistency check indicates whether the code phase of the first code and the carrier frequency offset of the first GNSS signal are affected by interference from a wireless network signal transmitted by the wireless transmitter; and
based on the result of the consistency check indicating that the code phase of the first code and the carrier frequency offset of the first GNSS signal are unaffected by interference, configuring the GNSS wireless receiver using the tracking information to detect a second GNSS signal of a second frequency band.

27. The method of claim 25, further comprising:
receiving, from the GNSS wireless receiver after the GNSS wireless receiver has been configured using the tracking information, a sequence of correlation outputs generated using a second GNSS signal;
performing a measurement operation based on the sequence of correlation outputs to generate a code phase;
decoding the sequence of correlation outputs to generate a navigation message;
determining a distance between a satellite and the GNSS wireless receiver based on the code phase;
determining a position of the satellite based on the navigation message; and
determining the position of the GNSS wireless receiver based on the distance and the position of the satellite.

28. The method of claim 25, wherein the GNSS wireless receiver includes a first multiplier and a second multiplier, the method further comprising:
multiplying, using the first multiplier, the first GNSS signal with a carrier signal of the first frequency band to generate a first baseband signal; and
multiplying, using the second multiplier, the first baseband signal with a reference code to generate first correlation outputs;
configuring a frequency of the carrier signal based on the carrier frequency offset of the first GNSS signal; and
configuring a code phase of the reference code based on the code phase of the first code.

29. The method of claim 28, further comprising:
supplying, by a frequency synthesizer configured based on the carrier frequency offset, the carrier signal to the first multiplier; and
setting the code phase of the reference code using a delay chain configured based on the code phase of the first code.

30. The method of claim 28, further comprising:
controlling, by the measurement engine, the GNSS wireless receiver to perform multiple correlation operations, each correlation operation of the multiple correlation operations being between the first baseband signal and a reference code with a different code phase; and
identifying, based on correlation outputs of the multiple correlation operations, a code phase that provides a maximum correlation.

31. The method of claim 28, further comprising:
adjusting, using a delay locked loop (DLL), the code phase of the reference code to match the code phase of the first code.

32. The method of claim 28, further comprising:
adjusting, using a phase locked loop (PLL), the frequency of the carrier signal to match a carrier frequency of the first GNSS signal.

33. The method of claim 24, wherein the one or more processors implement a position engine configured to perform the position calculation operation, the method further comprising causing the position engine to use the set of measurements to perform the position calculation operation based on at least one of:
forwarding the set of measurements to the position engine without forwarding the first measurement,
marking the first measurement with an indicator to cause the position engine to exclude the first measurement from the position calculation operation,
transmitting a set of constant or default values to the position engine instead of the first measurement to cause the position engine to exclude the set of constant or default values from the position calculation operation, or
transmitting a previously-transmitted measurement to the position engine instead of the first measurement to cause the position engine to exclude the previously-transmitted measurement from the position calculation operation.

34. The method of claim 24, further comprising:
receiving, by the one or more processors, the plurality of measurements from the measurement engine; and
responsive to determining that the wireless transmitter is active in the first frequency band when the GNSS wireless receiver receives the first GNSS signal, performing, by the one or more processors, the position calculation operation using the set of measurements that are from the plurality of measurements and apart from the first measurement.

35. The method of claim 24, wherein determining that the wireless transmitter is actively transmitting at least one wireless network signal having a frequency or harmonic frequency in the first frequency band comprises determining that the wireless transmitter transmits a wireless network signal with a harmonic component that has a frequency in the first frequency band, the wireless network signal being in a second frequency band.

36. The method of claim 24, wherein determining that the wireless transmitter is actively transmitting at least one wireless network signal having a frequency or harmonic frequency in the first frequency band comprises determining that the wireless transmitter transmits a wireless network signal in the first frequency band.

37. The method of claim 24, wherein determining that the wireless transmitter is actively transmitting at least one wireless network signal having a frequency or harmonic frequency in the first frequency band comprises determining that a communication channel over the first frequency band has been established between the wireless transmitter and a base station or an access point.

38. The method of claim 24, wherein the first frequency band is associated with a Wi-Fi signal.

39. The method of claim 24, wherein the first frequency band is associated one of: second harmonics of Long Term Evolution (LTE) band 13, or second harmonics of LTE band 14.

40. The method of claim 39, wherein the first GNSS signal comprises a Galileo E1 signal.

41. The method of claim 39, wherein the first GNSS signal comprises a BeiDou (BDS) B1 signal.

42. The method of claim 39, wherein the first GNSS signal comprises a Global Navigation Satellite System (GLONASS) G1 signal.

43. The method of claim 39, wherein the first GNSS signal comprises a Global Positioning System (GPS) L1 signal.

44. The method of claim 24, further comprising:
responsive to determining that the wireless transmitter is actively transmitting at least one wireless network signal having a frequency or harmonic frequency in the first frequency band during the time when the GNSS wireless receiver is receiving the first GNSS signal, performing the clock bias calculation operation using the one or more measurements that are from the plurality of measurements and apart from the first measurement.

45. The method of claim 44, further comprising:
performing the clock bias calculation operation using a measurement generated based on a single GNSS signal, in combination with a known position of the GNSS receiver.

46. The method of claim 44, further comprising:
transmitting a vehicle-to-everything (V2X) message during a time slot determined using a local clock after the local clock has been corrected according to a result of the clock bias calculation operation.

47. A non-transitory computer readable medium containing instructions that, when executed by one or more processors, cause the one or more processors to:
generate a plurality of measurements based on Global Navigation Satellite System (GNSS) signals received by a GNSS wireless receiver, wherein the plurality of measurements includes a first measurement generated based on a first GNSS signal;
determine whether a wireless transmitter is actively transmitting at least one wireless network signal having a frequency or harmonic frequency in a first frequency band during a time when the GNSS wireless receiver is receiving the first GNSS signal, the first frequency band being a frequency band of the first GNSS signal; and
responsive to determining that the wireless transmitter is actively transmitting at least one wireless network signal having a frequency or harmonic frequency in the first frequency band during the time when the GNSS wireless receiver is receiving the first GNSS signal, perform one or more of the following operations after generating the first measurement and at least one additional measurement of the plurality of measurements:
(i) a position calculation operation using a set of measurements that are from the plurality of measurements and apart from the first measurement or (ii) a clock bias calculation operation using one or more measurements that are from the plurality of measurements and apart from the first measurement.

48. An apparatus comprising:
means for generating a plurality of measurements based on Global Navigation Satellite System (GNSS) signals received by a GNSS wireless receiver, wherein the plurality of measurements includes a first measurement generated based on a first GNSS signal;
means for determining whether a wireless transmitter is actively transmitting at least one wireless network signal having a frequency or harmonic frequency in a first frequency band during a time when the GNSS wireless receiver is receiving the first GNSS signal, the first frequency band being a frequency band of the first GNSS signal; and
means for responsive to determining that the wireless transmitter is actively transmitting at least one wireless network signal having a frequency or harmonic frequency in the first frequency band during the time when the GNSS wireless receiver is receiving the first GNSS signal, performing one or more of the following operations after the first measurement and at least one additional measurement of the plurality of measurements have been generated: (i) a position calculation operation using a set of measurements that are from the plurality of measurements and apart from the first measurement or (ii) a clock bias calculation operation using one or more measurements that are from the plurality of measurements and apart from the first measurement.

* * * * *